(12) United States Patent
Aoki et al.

(10) Patent No.: US 10,650,756 B2
(45) Date of Patent: *May 12, 2020

(54) SURFACE LIGHT SOURCE DEVICE AND LIQUID CRYSTAL DISPLAY UNIT

(75) Inventors: Tomio Aoki, Kanagawa (JP); Masatake Hayashi, Kanagawa (JP); Shozo Masuda, Tokyo (JP); Tadashi Morimoto, Tokyo (JP)

(73) Assignee: Saturn Licensing LLC, New York, NY (US)

(*) Notice: Subject to any disclaimer, the term of this patent is extended or adjusted under 35 U.S.C. 154(b) by 487 days.

This patent is subject to a terminal disclaimer.

(21) Appl. No.: 12/579,856

(22) Filed: Oct. 15, 2009

(65) Prior Publication Data

US 2010/0033649 A1 Feb. 11, 2010

Related U.S. Application Data

(63) Continuation of application No. 11/820,222, filed on Jun. 18, 2007, now Pat. No. 7,658,529.

(30) Foreign Application Priority Data

Jun. 21, 2006 (JP) .................................. 2006-171379

(51) Int. Cl.
*G09G 3/34* (2006.01)
*G02F 1/1335* (2006.01)
(Continued)

(52) U.S. Cl.
CPC ..... *G09G 3/3426* (2013.01); *G02F 1/133603* (2013.01); *G09G 3/3413* (2013.01);
(Continued)

(58) Field of Classification Search
CPC .... G02B 6/001; G02B 6/0008; G02B 6/0068; G02B 6/0021; G02B 6/0055;
(Continued)

(56) References Cited

U.S. PATENT DOCUMENTS 5,936,347 A * 8/1999 Isaka et al. .................. 313/509
6,431,719 B1 * 8/2002 Lau et al. ..................... 362/95
(Continued)

FOREIGN PATENT DOCUMENTS

DE 10-2006-002275 A1 7/2006
JP H08320213 A 12/1996
(Continued)

OTHER PUBLICATIONS

Kakinuma et al., "Color Expression", Nikkei Electronics, Dec. 20, 2004, No. 889, pp. 123-128.
(Continued)

*Primary Examiner* — Bryon T Gyllstrom
(74) *Attorney, Agent, or Firm* — Wolf, Greenfield & Sacks, P.C.

(57) ABSTRACT

A surface light source device which illuminates a transmission-type liquid crystal display unit from the back surface includes P×Q surface light source units with individually controlled light sources. Each of the light sources includes a plurality of light-emitting element units. Each of the light-emitting element units includes at least one red light-emitting element that emits red light, at least one green light-emitting element that emits green light, and at least one blue light-emitting element that emits blue light. The center of mass of a luminance profile based on each of a plurality of red light-emitting elements, a plurality of green light-emitting elements, and a plurality of blue light-emitting elements in each surface light source unit substantially coincides with the center of mass of the surface light source unit.

8 Claims, 14 Drawing Sheets

(51) Int. Cl.
  *G09G 3/36* (2006.01)
  *G02F 1/13357* (2006.01)
(52) U.S. Cl.
  CPC ............ *G02F 2001/133613* (2013.01); *G09G 3/3648* (2013.01); *G09G 2320/0233* (2013.01); *G09G 2320/064* (2013.01); *G09G 2320/0646* (2013.01); *G09G 2360/145* (2013.01); *G09G 2360/16* (2013.01)
(58) Field of Classification Search
  CPC .... G02B 6/0061; B64F 1/20; B64F 1/133603; B64F 1/133611; B64F 1/133605; F21Y 2101/02; F21K 9/00; F21S 10/02
  USPC .... 362/23, 27, 29, 559, 612, 613, 231, 97.3, 362/812; 40/544
  See application file for complete search history.

(56) References Cited

U.S. PATENT DOCUMENTS

| | | | |
|---|---|---|---|
| 7,018,060 B2 * | 3/2006 | Choi et al. | 362/601 |
| 7,097,317 B2 * | 8/2006 | Kim | 362/29 |
| 7,554,625 B2 | 6/2009 | Koganezawa | |
| 7,658,529 B2 * | 2/2010 | Aoki et al. | 362/559 |
| 7,780,312 B2 * | 8/2010 | Han et al. | 362/235 |
| 7,812,510 B2 * | 10/2010 | Minami | H01J 9/185 |
| | | | 313/292 |
| 2005/0001537 A1 | 1/2005 | West et al. | |
| 2005/0135097 A1 | 6/2005 | Kawabata et al. | |
| 2005/0169007 A1 | 8/2005 | Chou | |
| 2005/0184952 A1 | 8/2005 | Konno et al. | |
| 2006/0245204 A1 * | 11/2006 | Mizuta | 362/559 |
| 2007/0081330 A1 * | 4/2007 | Lee et al. | 362/231 |
| 2008/0123022 A1 | 5/2008 | Aoki et al. | |

FOREIGN PATENT DOCUMENTS

| | | |
|---|---|---|
| JP | 11-003051 A | 1/1999 |
| JP | 2002374004 A2 | 12/2002 |
| JP | 2004-191490 A1 | 8/2004 |
| JP | 2005-258403 | 9/2005 |
| JP | 2005-339822 A | 12/2005 |
| TW | 200801707 A | 1/2008 |
| WO | WO 03/077013 A2 | 9/2003 |
| WO | WO 2006/040937 A1 | 4/2006 |
| WO | WO 2007/096817 A1 | 8/2007 |

OTHER PUBLICATIONS

Shiga et al., Reduction of LCTV Backlight Power and Enhancement of Gray Scale Capability by Using an Adaptive Dimming Technique. SID Digest. 2003;49(2):1364.

* cited by examiner

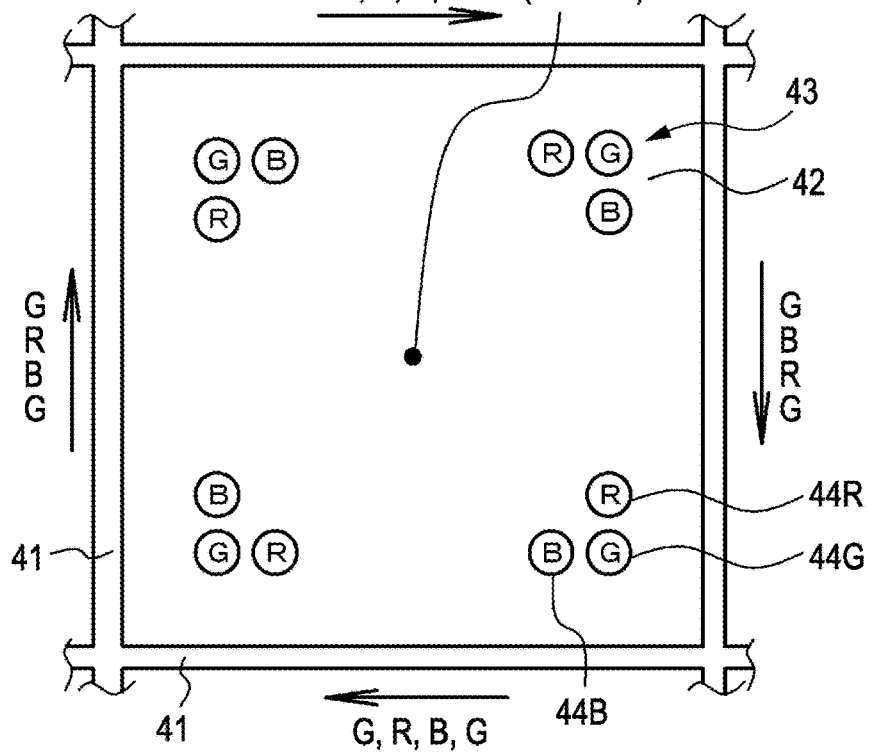
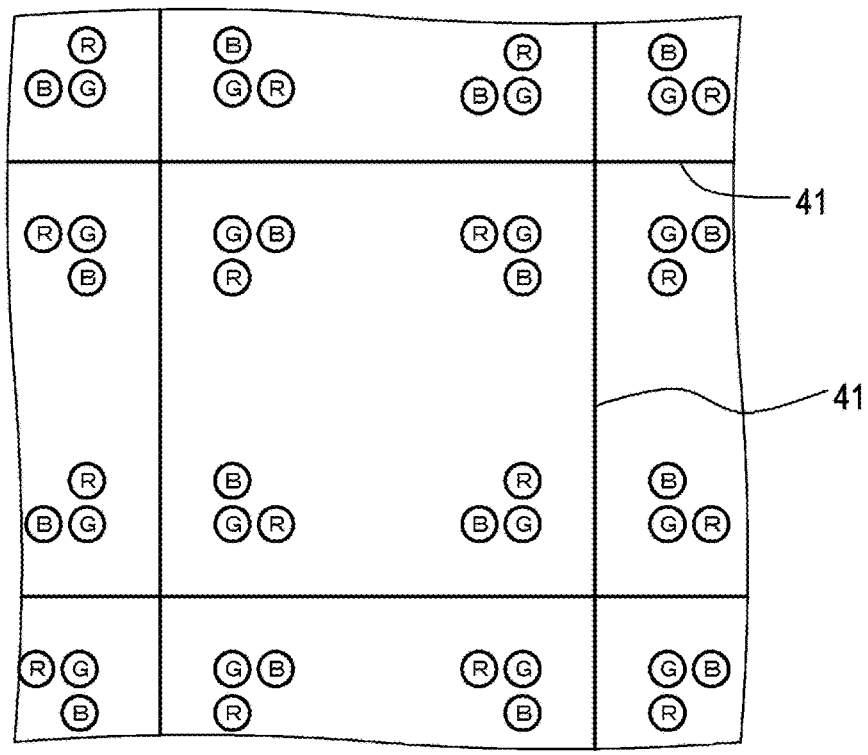

US 10,650,756 B2

SURFACE LIGHT SOURCE DEVICE AND LIQUID CRYSTAL DISPLAY UNIT

CROSS REFERENCES TO RELATED APPLICATIONS

The present invention is a Continuation of U.S. application Ser. No. 11/820,222, filed Jun. 18, 2007, which, in turn, claims priority under 35 U.S.C. § 119 to Japanese Patent Application JP 2006-171379 filed in the Japanese Patent Office on Jun. 21, 2006, the entire contents of which are incorporated herein by reference.

BACKGROUND OF THE INVENTION

1. Field of the Invention

The present invention relates to a surface light source device and a liquid crystal display unit.

2. Description of the Related Art

In a liquid crystal display unit, liquid crystal itself does not emit light. Thus, for example, a so-called direct-type surface light source device (backlight) that radiates light to the display area of a liquid crystal display unit is arranged on the back surface of the display area formed by a plurality of pixels. It should be noted that in a color liquid crystal display unit, one pixel is formed by three sub pixels including a red light-emitting sub pixel, a green light-emitting sub pixel, and a blue light-emitting sub pixel. By causing liquid crystal cells constituting each pixel or sub pixel to operate as a kind of optical shutter (light valve), that is, by controlling the light transmittance (aperture ratio) of each pixel or each sub pixel, the light transmittance of illumination light (for example, white light) emitted from the surface light source device is controlled, thus displaying an image.

In the related art, a surface light source device of a liquid crystal display unit assembly illuminates the entire display area with uniform and constant brightness. A surface light source device having a configuration different from that of the above-mentioned surface light source device is known, as disclosed in, for example, Japanese Unexamined Patent Application Publication No. 2005-258403, in which the surface light source device includes a plurality of surface light source units, and the illuminance distribution in a plurality of display area units are changed.

Such a surface light source device is controlled on the basis of the method as described below. That is, the maximum luminance of the respective surface light source units constituting the surface light source device is given as $Y_{max}$, and the maximum value (specifically, for example, 100%) of the light transmittance (aperture ratio) of pixels in the display area unit is given as $Lt_{max}$. Further, the light transmittance (aperture ratio) of each pixel for obtaining a display luminance $y_0$ for each pixel in the display area unit when the respective surface light source units constituting the surface light source device have the maximum luminance $Y_{max}$ is given as $Lt_0$. Then, in this case, the light source luminance $Y_0$ of each of the surface light source units constituting the surface light source device may be controlled so as the satisfy the following relationship.

$$Y_0 \cdot Lt_{max} = Y_{max} \cdot Lt_0$$

The conceptual illustration of such control is given in FIGS. 11A and 11B. In this case, the light source luminance $Y_0$ of the surface light source unit is changed for every frame (referred to as the image display frame for the convenience of description) in the image display of the liquid crystal display unit.

By means of the control of the surface light source device (often referred to as the division driving of the surface light source device) as described above, it is possible to achieve an increase in contrast ratio due to an increase in white level and a decrease in black level in the liquid crystal display unit. As a result, it is possible to achieve an improvement in the quality of image display, and a reduction in the power consumption of the surface light source device.

In the technique disclosed in Japanese Unexamined Patent Application Publication No. 2005-258403, four light emitting diodes (LEDs) are arranged in one surface light source unit (see paragraph [0071] and FIG. 18 of Japanese Unexamined Patent Application Publication No. 2005-258403). The arrangement of four LEDs disclosed in Japanese Unexamined Patent Application Publication No. 2005-258403 is schematically shown in FIG. 12A.

Further, a part of the arrangement of light emitting diodes in a surface light source device that illuminates the entire display area with uniform and constant brightness is exemplified in FIGS. 13A and 14A. One example of such arrangement is featured on pages 124 to 128 of Nikkei Electronics, Vol. 889, Dec. 20, 2004. Here, in the drawings, the red light-emitting diode is indicated by a symbol with a character "R" enclosed inside a circle, the green light-emitting diode is indicated by a symbol with a character "G" enclosed inside a circle, and the blue light-emitting diode is indicated by a symbol with a character "B" enclosed inside a circle.

SUMMARY OF THE INVENTION

In the arrangement of the four LEDs shown in FIG. 12A, local variation in luminescent color (shift of luminescent color) occurs in the outer edge area of the surface light source unit as shown in FIG. 12B. That is, while white color is emitted from the central portion of the surface light source unit, light of a color slightly different from white is emitted from the outer edge area of the surface light source unit. It should be noted that in FIG. 12B, the narrow dotted lines schematically indicate the contour lines of a given value in a luminance profile produced by the blue light-emitting LED. Further, the one-dot chain lines schematically indicate the contour lines of a given value in a luminance profile produced by the red light-emitting LED. Although the counter lines of a given value in a luminance profile produced by the green light-emitting LED are omitted from the drawing, the counter lines do not coincide with those of the luminance profile produced by the red light-emitting LED or the luminance profile produced by the green light-emitting LED.

Likewise, also in the case of attempting division driving of the surface light source device on the basis of the arrangement of the LEDs shown in FIGS. 13A and 14A, local variation of luminescent color (shift of luminescent color) occurs as shown in FIG. 13B or 14B. In FIGS. 13A and 14A, solid lines indicate the divided state of the surface light source device when attempting division driving of the surface light source device. Further, in FIGS. 13B and 14B, the solid line indicates the portion corresponding to the outer edge of the surface light source unit.

Such local color variation (color shift) in the outer edge area of the surface light source unit causes a shift from a desired color in the pixels of the liquid crystal display unit corresponding to the outer edge area of the surface light source unit.

Therefore, it is desirable to provide a surface light source device having a configuration and a structure in which local color variations (color shifts) do not readily occur in the outer edge areas of surface light source units constituting a surface light source device that is subjected to division driving.

According to each of first to third aspects of the present invention, there is provided a surface light source device which illuminates a transmission-type liquid crystal display unit from a back surface, the liquid crystal display unit having a display area including pixels arranged in a two-dimensional matrix, including P×Q surface light source units corresponding to P×Q imaginary display area units obtained by assuming that the display area of the liquid crystal display unit is divided into the P×Q imaginary display area units. Light sources included in the surface light source units are individually controlled, a light source included in each of the surface light source units includes a plurality of light-emitting element units, and each of the light-emitting element units includes at least one red light-emitting element that emits red light, at least one green light-emitting element that emits green light, and at least one blue light-emitting element that emits blue light.

Further, in the surface light source device according to the first aspect of the present invention, the center of mass of a luminance profile based on a plurality of red light-emitting elements in each of the surface light source units substantially coincides with the center of mass of the surface light source unit, the center of mass of a luminance profile based on a plurality of green light-emitting elements in each of the surface light source units substantially coincides with the center of mass of the surface light source unit, and the center of mass of a luminance profile based on a plurality of blue light-emitting elements in each of the surface light source units substantially coincides with the center of mass of the surface light source unit.

Here, a state in which the center of mass of a luminance profile based on a plurality of red light-emitting elements in the surface light unit substantially coincides with the center of mass of this surface light source unit is specified as follows. That is, in a surface light source device, only a plurality of red light-emitting elements in one surface light source unit are turned on to measure a two-dimensional luminance profile based on the light emissions from the plurality of red light-emitting elements, and the center of mass in the portion of the two-dimensional luminance profile included in a projection image of the outer edge of the surface light source unit is determined. Then, if the position of the center of mass of this luminance profile is located inside a circle of a diameter D (mm) drawn around the center of mass of the surface light source unit (which normally coincides with the center point of the surface light source unit), it is regarded that the centers of mass of the luminance profile and surface light source unit "substantially coincide" with each other. Here, with the surface area of the surface light source unit taken as $S_0(mm^2)$, the value of "D" (unit: mm) satisfies the following relation:

$$D=0.2S_0^{1/2}.$$

The same definition applies to the state in which "the center of mass of a luminance profile based on a plurality of green light-emitting elements in each of the surface light source units substantially coincides with the center of mass of the surface light source unit" or "the center of mass of a luminance profile based on a plurality of blue light-emitting elements in each of the surface light source units substantially coincides with the center of mass of the surface light source unit". It should be noted that when a predetermined position in a luminance profile is set as the origin (0, 0), and the luminance at a point $(x_i, y_j)$ in the luminance profile is given as $L(x_i, y_j)$, the coordinates $(X_c, Y_c)$ of the center of mass of the luminance profile can be determined from Equations (A) and (B) below.

$$X_c = \frac{\sum_i \sum_j x_i L(x_i, y_j)}{\sum_i \sum_j L(x_i, y_j)} \quad (A)$$

$$Y_c = \frac{\sum_i \sum_j y_j L(x_i, y_j)}{\sum_i \sum_j L(x_i, y_j)} \quad (B)$$

Further, in the surface light source device according to the second aspect of the present invention, the center of mass of positions of a plurality of red light-emitting elements in each of the surface light source units substantially coincides with the center of mass of the surface light source unit, the center of mass of positions of a plurality of green light-emitting elements in each of the surface light source units substantially coincides with the center of mass of the surface light source unit, and the center of mass of positions of a plurality of blue light-emitting elements in each of the surface light source units substantially coincides with the center of mass of the surface light source unit.

Here, when the center of mass of positions of a plurality of red light-emitting elements in a surface light source unit substantially coincides with the center of mass of this surface light source unit, this means that, with the surface area of the surface light source unit taken as $S_0(mm^2)$, the distance d from the center of mass of the positions of the plurality of red light-emitting elements (the center point of the plurality of red light-emitting elements as determined from the position coordinates of the plurality of red light-emitting elements) to the center of mass of the surface light source unit (which normally coincides with the center point of the surface light source device) satisfies the following relationship. The same definition applies to the plurality of green light-emitting elements and the plurality of blue light-emitting elements.

$$d \leq 0.05 S_0^{1/2}$$

Further, in the surface light source device according to the third aspect of the present invention, the surface light source units have a rectangular shape in plan view, and in each of the surface light source units, at least one red light-emitting element, at least one green light-emitting element, and at least one blue light-emitting element are arranged along each of sides of the surface light source unit, and the red light-emitting element, the green light-emitting element, and the blue light-emitting element are arranged in the same order along four sides of the surface light source unit.

It should be noted that in the surface light source device according to the third aspect of the present invention, when there are arranged a plurality of red light-emitting elements, and/or a plurality of green light-emitting elements, and/or a plurality of blue light-emitting elements along one side of the surface light source unit, it is preferable that no light emitting elements of the same color be arranged adjacent to each other. Further, it is preferable that the arrangement order of the red light-emitting elements, the green light-emitting elements, and the blue light-emitting elements be the same also when viewed along the sides of two adjacent surface light source units.

In the surface light source devices according to the first to third aspects of the present invention (hereinafter, these will be generically referred to as the surface light source device according to an embodiment of the present invention), the light source included in one surface light source unit includes a plurality of light-emitting element units. Specifically, it suffices that the number of light-emitting element units be larger than two. In this case, it is preferable that the respective red light-emitting elements constituting the plurality of light-emitting element units be arranged two-rotation symmetrically, the respective green light-emitting elements constituting the plurality of light-emitting element units be arranged two-rotation symmetrically, and that the respective blue light-emitting elements constituting the plurality of light-emitting element units be arranged two-rotation symmetrically. Further, most preferably, the number of light-emitting elements is four.

Further, when the light source included in one surface light source unit includes four light-emitting element units, it is preferable that in each one surface light source unit, the respective red light-emitting elements constituting the four light-emitting element units be arranged four-rotation symmetrically, the respective green light-emitting elements constituting the four light-emitting element units be arranged four-rotation symmetrically, and that the respective blue light-emitting elements constituting the four light-emitting element units be arranged four-rotation symmetrically. Further, in this case, it is desirable that each of the light-emitting element units include one red light-emitting element, two green light-emitting elements, and one blue light-emitting element, these four light emitting elements be arranged at the four corners of an imaginary rectangle, and when assuming a coordinate system whose origin lies at the center of mass of the surface light source unit that has a rectangular shape in plan view, the green light-emitting elements be respectively arranged at one of the four corners of the imaginary rectangle located closest to the origin and at one of the four corners of the imaginary rectangle located farthest from the origin, and the red light-emitting element and the blue light-emitting element be respectively arranged at the remaining two corners. Alternatively, in this case, it is desirable that each of the light-emitting element units include one red light-emitting element, one green light-emitting element, and one blue light-emitting element, and that these three light emitting elements be respectively arranged at a distal end portion of a vertical bar of an imaginary character "L", a distal end portion of a horizontal bar of the imaginary character "L", and an intersection between the vertical bar and the horizontal bar. Alternatively, it is also possible to adopt a configuration in which each of the light-emitting element units include one red light-emitting element, two green light-emitting elements, and one blue light-emitting element, and when a set of units arranged as described above is referred to as the "2×2 unit", each light-emitting element unit includes 1×2=2"2×2 units", or 2×2=4"2×2 units", or 2×3=6"2×2 units", or alternatively a×b=a·b "2×2 units".

In the surface light source device according to an embodiment of the present invention including the various preferred modes and configurations as described above, each two adjacent surface light source units may be partitioned from each other by a partition wall. Due to the partition wall, the transmission, reflection, or transmission and reflection of light emitted from the light source constituting the surface light source unit is controlled. It should be noted that in this case, one surface light source unit is surrounded by four partition walls, or three partition walls and one side face of a housing (which will be described later), or by two side walls and two side faces of a housing. Examples of the material forming the partition wall include acrylic resin, polycarbonate resin, and ABS resin. The surface of the partition wall may be imparted with a light diffuse reflection function or a specular reflection function. A light diffuse reflection function may be imparted to the surface of the partition wall by forming irregularities on the surface of the partition wall on the basis of the sand blast method, or attaching a film (light diffusion film) having irregularities onto the surface of the partition wall. Further, a specular reflection function can be imparted to the surface of the partition wall by attaching a light reflecting film onto the surface of the partition wall, or forming a light-reflecting layer on the surface of the partition wall by plating, for example.

In the surface light source device according to an embodiment of the present invention including the various preferred configurations as described above, light emitting diodes (LEDs) may be used as the light emitting elements. In the case where the light emitting elements are formed by light emitting diodes, a red light-emitting diode that emits red light having a wavelength of, for example, 640 nm may be used as the red light-emitting element, a green light-emitting diode that emits green light having a wavelength of, for example, 530 nm may be used as the green light-emitting element, and a blue light-emitting diode that emits blue light having a wavelength of, for example, 450 nm may be used as the blue light-emitting element. White light can be obtained by the light emissions from these light emitting diodes. Although light emitting elements (light emitting diodes) which emit light of a fourth color and light of a fifth color . . . other than red, green, and blue may be further provided, in this case, the light emitting elements that emit light of the fourth color and light of the fifth color . . . also need to satisfy the specifications required of the red light-emitting element, green light-emitting element, and blue light-emitting element.

The light emitting diode may have a so-called face up structure or may have a flip-chip structure. That is, it is possible to adopt a structure in which the light emitting diode is formed by a substrate and a light emitting layer formed on the substrate, and light is emitted to the outside from the light emitting layer, or a structure in which light from the light emitting layer passes through the substrate to be emitted to the outside. More specifically, the light emitting diode (LED) has a laminate structure including a first clad layer, which is formed on the substrate and made of a compound semiconductor layer having a first conductivity type (for example, n-type), an active layer formed on the first clad layer, and a second clad layer, which is formed on the first clad layer and made of a compound semiconductor layer having a second conductivity type (for example, p-type), and also includes a first electrode electrically connected to the first clad layer, and a second electrode electrically connected to the second clad layer. The layers forming the light emitting diode may be formed from known compound semiconductor materials depending on the luminous wavelength.

It should be noted that as in the Lambert Cyan type, a lens with a high light intensity in the rectilinear direction may be attached to the light emitting portion of the light emitting diode.

In the surface light source device according to an embodiment of the present invention, it is desirable to provide an optical sensor for measuring the light emission state of a light source (specifically, the luminance of a light source, the chromaticity of a light source, or the luminance and chromaticity of a light source). Although the number of optical sensors may be at least one, from the viewpoint of reliably measuring the light emission state of each surface light source unit, it is desirable to arrange a set of optical sensors for each one surface light source unit. A known photodiode or CCD device may be used as the optical sensor. Further, in this case, a set of optical sensors can be formed by a photodiode to which a red color filter is attached to measure the light intensity of red light, a photodiode to which a green color filter is attached to measure the light intensity of green light, and a photodiode to which a blue color filter is attached to measure the light intensity of blue light.

Here, the light transmittance (also called the aperture ratio) Lt of a pixel or sub pixel, the luminance (display luminance) y at the portion of a display area corresponding to the pixel or sub pixel, and the luminance (light source luminance) Y of a surface light source unit are defined as follows.

$Y_1$: A light source luminance, for example, the maximum value thereof, which hereinafter will be often referred to as a first specified light-source-transmittance value.

$Lt_1$: A light transmittance (aperture ratio) of a pixel or a sub pixel in a display area unit, for example, the maximum value thereof, which hereinafter will be often referred to as a first specified light-transmittance value.

$Lt_2$: A light transmittance (aperture ratio) of a pixel or a sub pixel that would be obtained by assuming that a control signal corresponding to a driving signal having a value equal to a maximum driving signal value $x_{U\text{-}max}$ in a display area unit, which represents the maximum value of the values of driving signals inputted to a driving circuit for driving all the pixels constituting the display area unit, has been supplied to the pixel or sub pixel. Hereinafter, this will be often referred to as a second specified light-transmittance value. It should be noted that $0 \leq Lt_2 \leq Lt_1$.

$y_2$: A display luminance that would be obtained by assuming that the light source luminance is at the first specified light-source-luminance value $Y_1$, and that the light transmittance (aperture ratio) of a pixel or sub pixel is at the second specified light-transmittance value $Lt_2$. Hereinafter, this will be often referred to as a second specified display-luminance value.

$Y_2$: A light source luminance of a surface light source unit which is required for making the luminance of a pixel or sub pixel be the second specified display-luminance value ($y_2$), assuming that a control signal corresponding to a driving signal having a value equal to the maximum driving signal value $x_{U\text{-}max}$ in a display area unit has been supplied to the pixel or sub pixel, and further provided that the light transmittance (aperture ratio) of the pixel or sub pixel has been corrected to the first specified light-transmittance value $Lt_1$. It should be noted, however, that there may be cases where the light source luminance $Y_2$ is subjected to a correction that takes into consideration the influence of the light source luminance of each surface light source unit on the light source transmittances of other surface light source units.

During the drive of the surface light source device according to an embodiment of the present invention, the luminance of a light source constituting a surface light source unit corresponding to a display area unit is controlled by the driving circuit so as to obtain a pixel luminance (the second specified display-luminance value $Y_2$ at the first specified light-transmittance value $Lt_1$) that would be obtained by assuming that a control signal corresponding to a driving signal having a value equal to the maximum driving signal value $x_{U\text{-}max}$ in a display area unit has been supplied to the pixel or sub pixel. Specifically, for example, the light source luminance $Y_2$ may be controlled (for example, may be decreased) so that the display luminance $y_2$ is obtained when the light transmittance (aperture ratio) of a pixel or sub pixel is set at the first specified light-transmittance value $Lt_1$. That is, for example, the light source luminance $Y_2$ of the surface light source unit may be controlled for every image display frame so as to satisfy Equation (1) below, where $Y_2 \leq Y_1$.

$$Y_2 \cdot Lt_1 = Y_1 \cdot Lt_2 \qquad (1)$$

The driving circuit may be formed by, for example, a surface-light-source controlling circuit (a backlight controlling unit and a surface-light-source-unit driving circuit) formed by a pulse-width modulation (PWM) signal generating circuit, a duty ratio controlling circuit, a light-emitting-diode (LED) driving circuit, an arithmetic circuit, a memory, or the like, as well as by a liquid-crystal-display-unit driving circuit formed by a known circuit such as a timing controller.

The surface light source device may further include an optical functional sheet group including a diffuser sheet, a prism sheet, and a polarization conversion sheet, or a reflection sheet.

A transmission-type liquid crystal display unit includes, for example, a front panel including a first transparent electrode, a rear panel including a second transparent electrode, and a liquid crystal material arranged between the front panel and the rear panel.

More specifically, the front panel includes, for example, a first substrate made of a glass substrate or a silicon substrate, a first transparent electrode (also called a common electrode and made of, for example, ITO) provided on the inner surface of the first substrate, and a polarization film provided on the outer surface of the first substrate. Further, in the case of a transmission-type color liquid crystal display unit, a color filter coated with an overcoat layer made of acrylic resin or epoxy resin is provided on the inner surface of the first substrate. Examples of the arrangement pattern of the color filter include a delta arrangement, a stripe arrangement, a diagonal arrangement, and a rectangle arrangement. Further, the front panel has a structure in which the first transparent electrode is further formed on the overcoat layer. On the other hand, more specifically, the rear panel includes, for example, a second substrate made of a glass substrate or a silicon substrate, a switching element formed on the inner surface of the second substrate, a second transparent electrode (also called a pixel electrode and made of, for example, ITO) whose conduction/non-conduction is controlled by the switching element, and a polarization film provided on the outer surface of the second substrate. An alignment layer is formed on the entire surface including the second transparent electrode. These various components and liquid crystal materials constituting a transmission type color liquid crystal display unit can be formed by known components and materials. Examples of the switching element include a three-terminal element such as an MOS type FET or a thin film transistor (TFT), or a two-terminal element such as an MIM element, a varistor element, or a diode formed on a single-crystal silicon semiconductor substrate.

An area where the first transparent electrode and the second transparent electrode overlap and which includes a liquid crystal cell corresponds to one pixel or one sub pixel. Further, in a transmission-type color liquid crystal display unit, a red light-emitting sub pixel (sub pixel [R]) constituting each pixel is formed by a combination of the above-mentioned area and a color filter that transmits red color, and a green light-emitting sub pixel (sub pixel [G]) is formed by a combination of the above-mentioned area and a color filter that transmits green light, and a blue light-emitting sub pixel (sub pixel [B]) is formed by a combination of the above-mentioned area and a color filter that transmits blue light. The arrangement pattern of the sub pixel [R], sub pixel [G], and sub pixel [B] coincides with the arrangement pattern of the color filter mentioned above. It should be noted that a pixel may not necessarily be formed by a set of three sub pixels including a red light-emitting sub pixel, a green light-emitting sub pixel, and a blue light-emitting sub pixel. It is also possible to form a pixel by a set of sub pixels having one or a plurality of sub pixels further added to these three sub pixels (for example, a set of sub pixels with an added sub pixel(s) emitting white light for enhanced luminance, a set of sub pixels with an added sub pixel(s) emitting light of complimentary color for increased color reproduction range, a set of sub pixels with an added sub pixel(s) emitting yellow light for increased color reproduction range, and a set of sub pixels with an added sub pixel(s) emitting yellow and cyan light for increased color reproduction range).

When the number $M_0 \times N_0$ of pixels arranged in a two-dimensional matrix is given as $(M_0, N_0)$, several resolutions for image display, such as VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536), and also (1920, 1035), (720, 480), (1280, 960), and the like can be exemplified as the specific value of $(M_0, N_0)$. However, the value of $(M_0, N_0)$ is not limited to these values. Although there are no limitations on the relationship between the value of $(M_0, N_0)$ and the value of $(P, Q)$, the relationship can be exemplified as shown in Table 1 below. The number of pixels constituting one display area unit can be exemplified as ranging from 20×20 to 320×240, more preferably from 50×50 to 200×200. The number of pixels in a display area unit may be constant or may vary.

TABLE 1

|  | Value of P | Value of Q |
| --- | --- | --- |
| VGA (640, 480) | 2~32 | 2~24 |
| S-VGA (800, 600) | 3~40 | 2~30 |
| XGA (1024, 768) | 4~50 | 3~39 |
| APRC (1152, 900) | 4~58 | 3~45 |
| S-XGA (1280, 1024) | 4~64 | 4~51 |
| U-XGA (1600, 1200) | 6~80 | 4~60 |
| HD-TV (1920, 1080) | 6~86 | 4~54 |
| Q-XGA (2048, 1536) | 7~102 | 5~77 |
| (1920, 1035) | 7~64 | 4~52 |
| (720, 480) | 3~34 | 2~24 |
| (1280, 960) | 4~64 | 3~48 |

In the surface light source device according to an embodiment of the present invention, by specifying the relation between the center of mass of the luminance profile based on the plurality of red light-emitting elements, green light-emitting elements, and blue light-emitting elements in each surface light source unit, and the center of mass of the surface light source unit, or by specifying the relation between the center of mass of the positions of the plurality of red light-emitting elements, green light-emitting elements, and blue light-emitting elements in each surface light source unit, and the center of mass of the surface light source unit, or by specifying the placement/arrangement of the plurality of red light-emitting elements, green light-emitting elements, and blue light-emitting elements in each surface light source unit, it is possible to reliably prevent local color variations (color shifts) from occurring in the outer edge area of the surface light source unit. As a result, it is possible to suppress the occurrence of a shift from a desired color in the pixels of the liquid crystal display unit corresponding to the outer edge area of the surface light source unit.

In the case where the surface light source units are partitioned from each other by partition walls in the surface light source device, the occurrence of local color variations (color shifts) in the outer edge areas of the surface light source units becomes more clearly noticeable due to the presence of the partition walls. In this regard, with the surface light source device according to an embodiment of the present invention, the occurrence of local color variations (color shifts) in the outer edge areas of the surface light source units can be reliably prevented, so no problem is likely to arise even when the surface light source units are partitioned from each other by partition walls.

Further, in the surface light source device according to an embodiment of the present invention, when the luminance of a light source constituting a surface light source unit corresponding to a display area unit is controlled so as to obtain a pixel luminance (the second specified display-luminance value $y_2$ at the first specified light-transmittance value $Lt_1$) that would be obtained by assuming that a control signal corresponding to a driving signal having a value equal to the maximum driving signal value $x_{U-max}$ in a display area unit has been supplied to a pixel, not only is it possible to achieve a reduction in the power consumption of the surface light source device, but also it is possible to achieve an increase in white level or a decrease in black level, thereby achieving a high contrast ratio (the ratio between the luminance of a display portion at full black and the luminance of a display portion at full white in the screen surface of a liquid crystal display unit, excluding external light reflection or the like). Since it is thus possible to enhance the brightness of a desired display area, an improvement can be achieved in terms of the quality of image display.

BRIEF DESCRIPTION OF THE DRAWINGS

FIGS. 2A and 2B are views schematically showing the arrangement of light emitting elements constituting a light-emitting element unit according to Embodiment 2;

DESCRIPTION OF THE PREFERRED
EMBODIMENTS

Surface light source devices according to embodiments of the present invention will now be described with reference to the drawings. Prior to the description of the embodiments, a brief description will be given of a transmission-type color liquid crystal display unit and a surface light source device which are suitably used in respective embodiments, with reference to FIGS. 5, 6, 7A and 7B, and 8.

Figure 5:
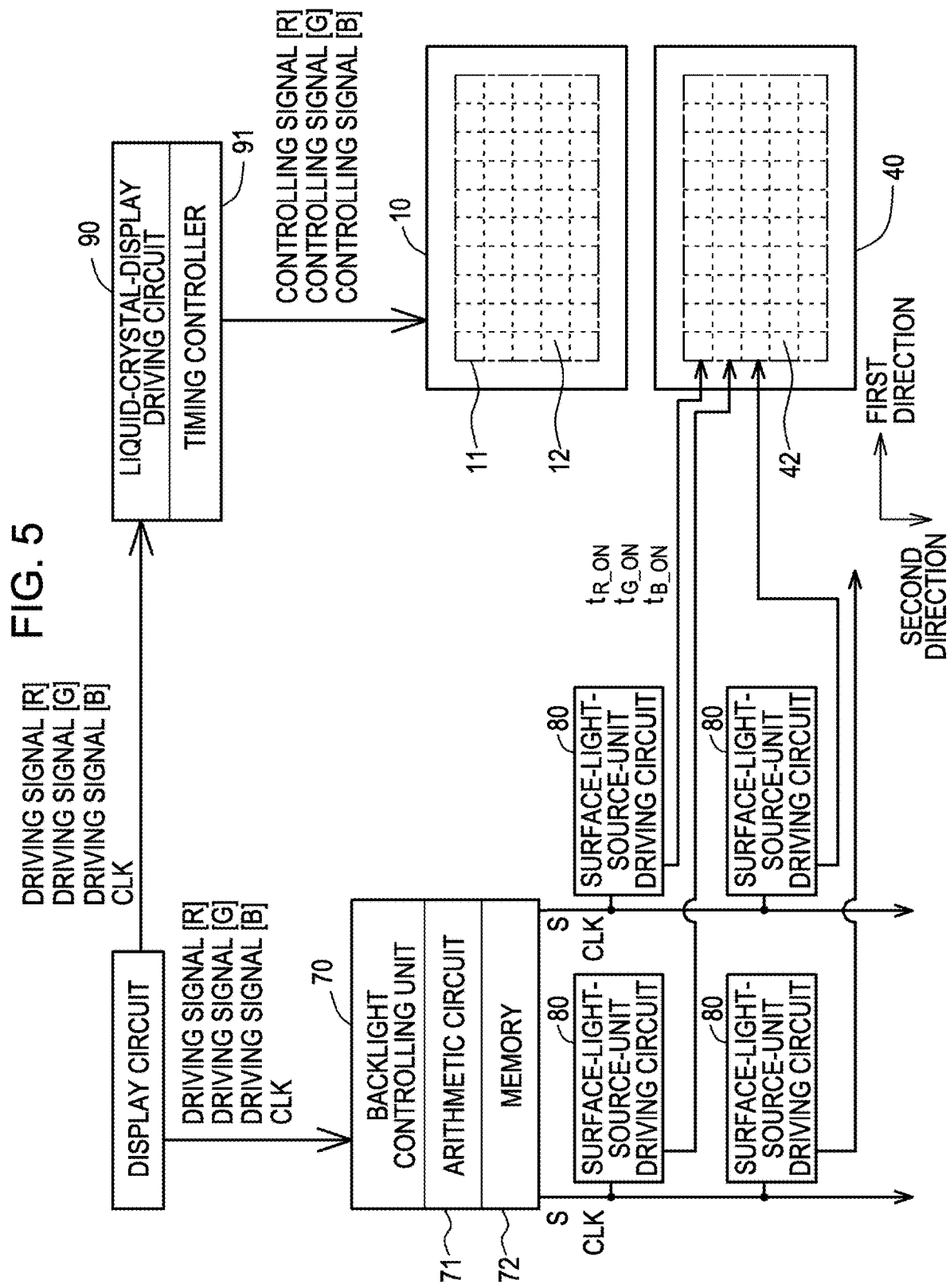
FIG. 5 is a conceptual diagram of a liquid crystal display unit assembly including a color liquid crystal display unit and a surface light source device suitable for use in an embodiment of the present invention.

As shown in the conceptual drawing of FIG. 5, a transmission-type color liquid crystal display unit 10 includes a display area 11 in which a total of $M_0 \times N_0$ pixels, including $M_0$ pixels arranged along a first direction and $N_0$ pixels arranged along a second direction, are arranged in a two-dimensional matrix. Here, it is assumed that the display area 11 is divided into P×Q imaginary display area units 12. Each display area unit 12 is formed by a plurality of pixels. Specifically, the color liquid crystal display unit 10 has an image display resolution that satisfies the HD-TV standard, for example, and when the number of $M_0 \times N_0$ pixels arranged in a two-dimensional matrix is expressed as ($M_0$, $N_0$), the number of pixels is represented as, for example, (1920, 1080). Further, the display area 11 (indicated by the one-dot chain line in FIG. 5) formed by pixels arranged in a two-dimensional matrix is divided into the P×Q imaginary display area units 12 (whose boundaries are indicated by the dotted lines). The value of (P, Q) is, for example, (19, 12). However, for the simplicity of drawing, the number of display area units 12 (and surface light source units 42 that will be described later) shown in FIG. 5 differs from this value. Each of the display area units 12 is formed by a plurality of (M×N) pixels, and the number of pixels constituting one display area unit 12 is, for example, about 10,000. Each pixel is formed by a set of a plurality of sub pixels that respectively emit light of different colors. More specifically, each pixel is formed by three sub pixels including a red light-emitting sub pixel (sub pixel [R]), a green light-emitting sub pixel (sub pixel [G]), and a blue light-emitting sub pixel (sub pixel [B]). The transmission-type color liquid crystal display unit 10 is line-sequentially driven. More specifically, the color liquid crystal display unit 10 has scanning electrodes (which extend along the first direction) and data electrodes (which extend along the second direction) that cross each other in a matrix form. The scanning electrodes are selected and scanned by inputting scanning signals to the scanning electrodes, and an image is displayed on the basis of data signals (which are signals based on control signals) inputted to the data electrodes, thus forming one screen.

Figure 8:
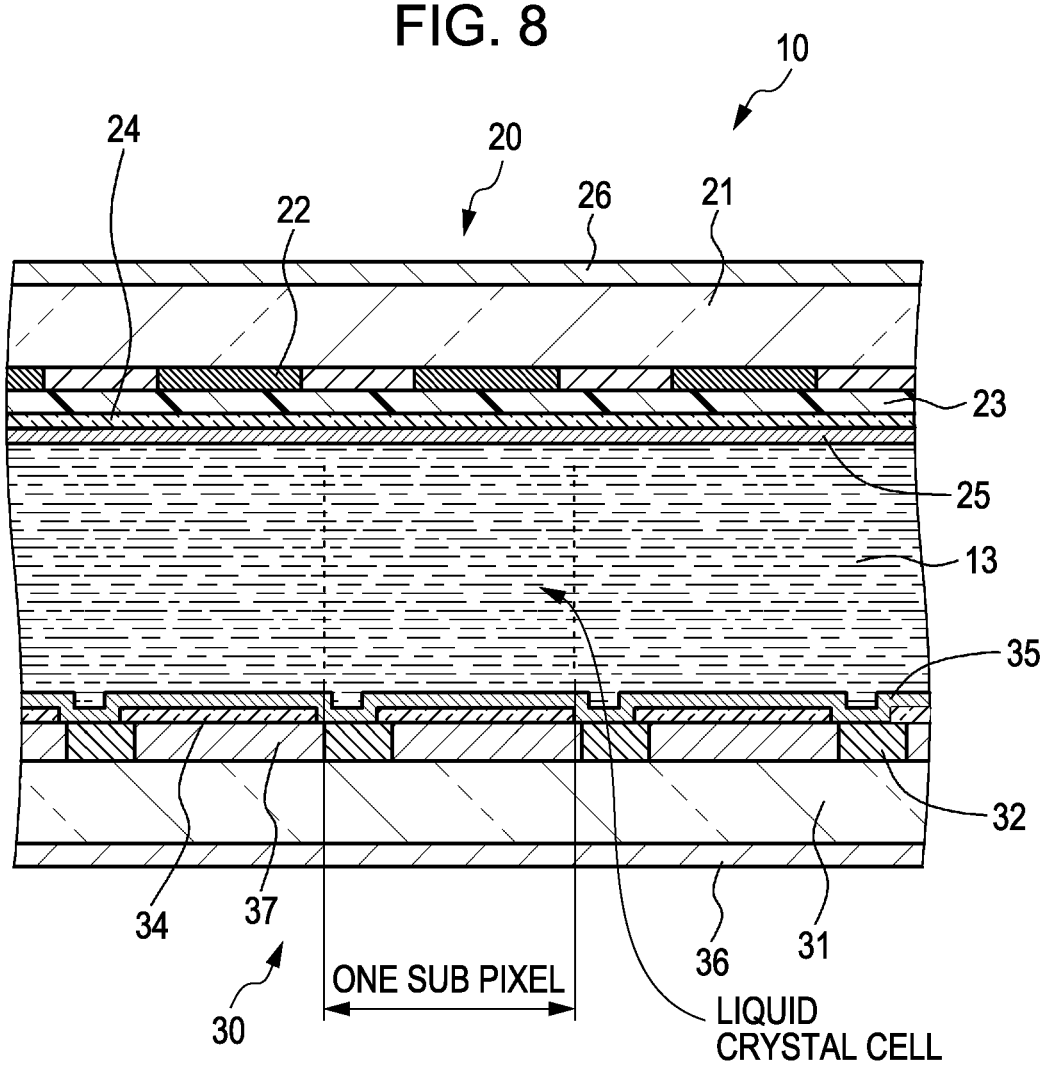
FIG. 8 is a schematic partial sectional view of a color liquid crystal display unit.

As shown in the schematic partial sectional view of FIG. 8, the color liquid crystal display unit 10 includes a front panel 20 having a first transparent electrode 24, a rear panel 30 having a second transparent electrode 34, and a liquid crystal material 13 arranged between the front panel 20 and the rear panel 30.

The front panel 20 includes, for example, a first substrate 21 made of a glass substrate, and a polarization film 26 provided on the outer surface of the first substrate 21. A color filter 22 coated with an overcoat layer 23 made of acrylic resin or epoxy resin is provided on the inner surface of the first substrate 21. The first transparent electrode 24 (also called a common electrode and made of, for example, ITO) is formed on the overcoat layer 23. An alignment layer 25 is formed on the first transparent electrode 24. On the other hand, the rear panel 30 includes, for example, a second substrate 31 made of a glass substrate, a switching element (specifically, a thin film transistor or TFT) 32 formed on the inner surface of the second substrate 31, a second transparent electrode (also called a pixel electrode and made of, for example, ITO) 34 whose conduction/non-conduction is controlled by the switching element 32, and a polarization film 36 provided on the outer surface of the second substrate 31. An alignment layer 35 is formed on the entire surface including the second transparent electrode 34. The front panel 20 and the rear panel 30 are jointed to each other at their respective outer peripheral portions through a sealant (not shown). It should be noted that the switching element 32 is not limited to a TFT. For example, the switching element 32 may be formed by an MIM element. Reference numeral 37 in the drawing denotes an insulating layer provided between each two adjacent switching elements 32.

Since these various components and liquid crystal materials constituting the transmission-type color liquid crystal display unit can be formed by known components and materials, detailed description thereof is omitted.

Figure 7A:
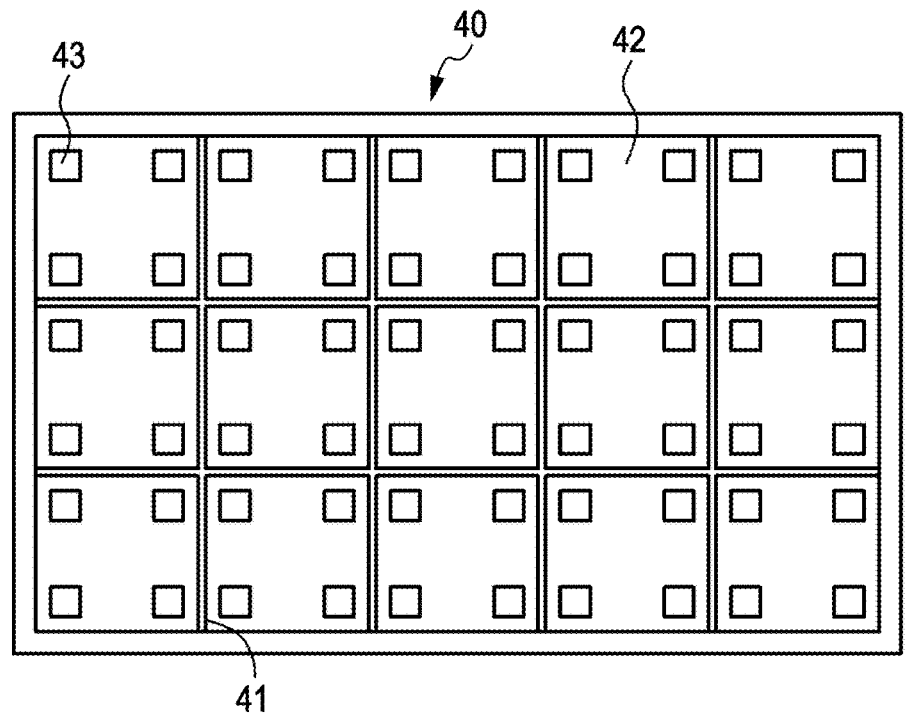
FIG. 7A is a view schematically showing the arrangement/placement of light emitting diodes and the like in a surface light source device according to an embodiment of the present invention.

A direct-type surface light source device (backlight) 40 is formed by P×Q surface light source units 42 corresponding to the P×Q imaginary display area units 12. Each surface light source unit 42 illuminates the display area unit 12 corresponding to that surface light source unit 42 from the back surface. Light sources included in the surface light source units 42 are individually controlled. It should be noted that although the surface light source device 40 is located below the color liquid crystal display unit 10, in FIG. 5, the color liquid crystal display unit 10 and the surface light source device 40 are shown separately. The placement/arrangement of light emitting diodes and the like in the surface light source device 40 are schematically shown in FIG. 7A, and a schematic partial sectional view of a liquid crystal display unit assembly including the color liquid crystal display unit 10 and the surface light source device 40 is shown in FIG. 7B.

A light source included in each surface light source unit 42 is formed by a plurality of light-emitting element units 43. Further, each light-emitting element unit 43 includes at least one red light-emitting diode which emits red light (specifically, a red light-emitting diode 44R), at least one green light-emitting diode which emits green light (specifically, a green light-emitting diode 44G), and at least one blue light-emitting diode which emits blue light (specifically, a blue light-emitting diode 44B). Each of the light emitting diodes 44R, 44G, 44B is driven on the basis of the pulse-width modulation (PWM) control method. It should be noted that the red light-emitting diode 44R emits red light (with a wavelength of, for example, 640 nm), the green light emitting diode 44G emits green light (with a wavelength of, for example, 530 nm), and the blue light emitting diode 44B emits blue light (with a wavelength of, for example, 450 nm).

Further, the shape of the surface light source units 42 is a rectangle in plan view.

Figure 7B:
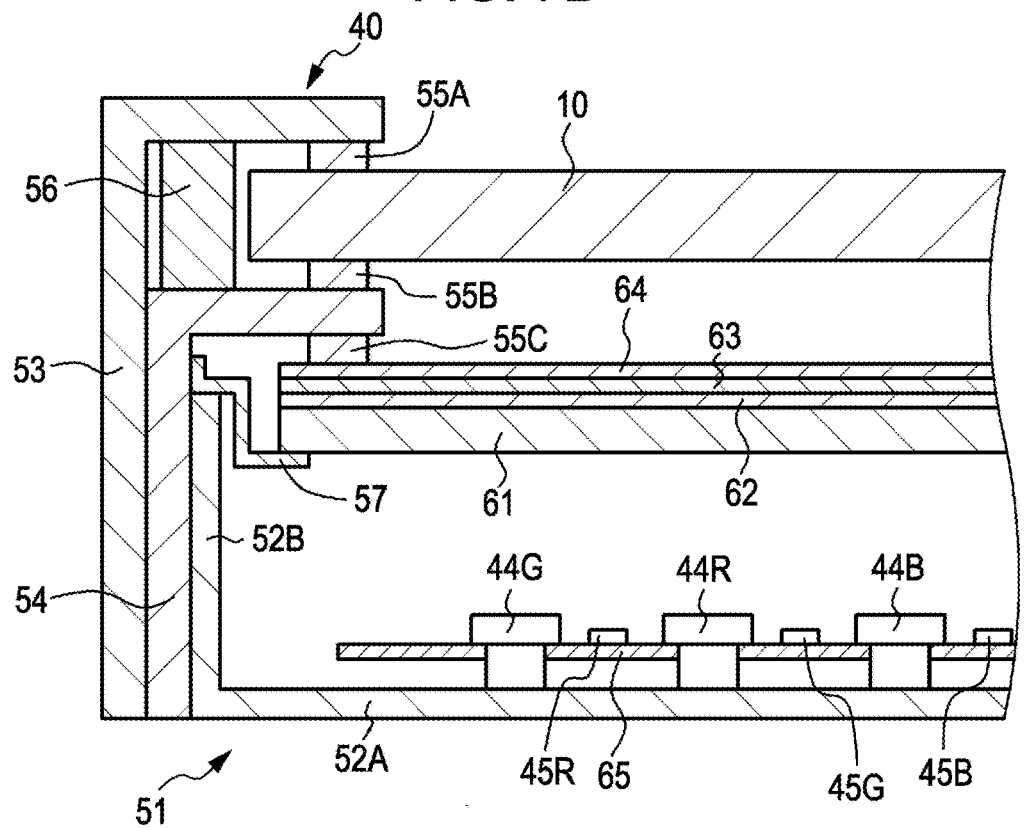
FIG. 7B is a schematic partial sectional view of a liquid crystal display unit assembly including a color liquid crystal display unit and a surface light source device according to an embodiment of the present invention.

As shown in the schematic partial sectional view of the liquid crystal display unit assembly of FIG. 7B, the surface light source device 40 has a housing 51 including an outer frame 53 and an inner frame 54. An end of the transmission-type color liquid display 10 is held in place so as to be sandwiched between the outer frame 53 and the inner frame 54 through spacers 55A, 55B. Further, a guide member 56 is arranged between the outer frame 53 and the inner frame 54, thus preventing displacement of the color liquid crystal display unit 10 that is sandwiched between the outer frame 53 and the inner frame 54. In an upper portion inside the housing 51, a diffuser plate 61 is attached to the inner frame 54 through a spacer 55C and a bracket member 57. Further, an optical functional sheet group including the diffuser sheet 62, a prism sheet 63, and a polarization conversion sheet 64 are laminated on the diffuser plate 61.

A reflective sheet 65 is provided in a lower portion inside the housing 51. In this case, the reflective sheet 65 is arranged with its reflection surface facing the diffuser plate 61, and is attached to a bottom surface 52A of the housing 51 via an attaching member (not shown). The reflective sheet 65 can be formed by a silver augmented reflective film formed by sequentially laminating a silver reflecting film, a low refractive index film, and a high refractive index film on a sheet substrate, for example. The reflective sheet 65 reflects light emitted from the plurality of light emitting diodes 44, or light that is reflected by a side face 52B of the housing 51 or, depending on the case, partition walls 41 shown in FIG. 7A. Accordingly, red light, green light, and blue light emitted from the plurality of red light-emitting diodes 44R which emit red light, the plurality of green light-emitting diodes 44G which emit green light, and the plurality of blue light-emitting diodes 44B which emit blue light are mixed together, thereby making it possible to obtain white light having high color purity as the illumination light. This illumination light passes through the group of optical functional sheets such as the diffuser sheet 62, the prism sheet 63, and the polarization conversion sheet 64, and illuminates the color liquid crystal display unit 10 from the back surface.

Photodiodes 45R, 45G, 45B as optical sensors are arranged near the bottom surface 52A of the housing 51. It should be noted that the photodiode 45R is a photodiode to which a red filter is attached to measure the light intensity of red light, the photodiode 45G is a photodiode to which a green filter is attached to measure the light intensity of green light, and the photodiode 45B is a photodiode to which a blue filter is attached to measure the light intensity of blue light. In this case, a set of optical sensors (photodiodes 45R, 45G, 45B) are arranged in one surface light source unit 42. The luminance and chromaticity of the light emitting diodes 44R, 44G, 44B are measured by the photodiodes 45R, 45G, 45B serving as optical sensors.

Although not absolutely necessary, each two adjacent surface light source units 42 constituting the surface light source device 40 are partitioned from each other by the partition wall 41. One surface light source unit 42 is surrounded by four partition walls 41, or by three partition walls 41 and one side face 52B of the housing 51, or by two partition walls 41 and two side faces 52B of the housing 51.

Figure 6:
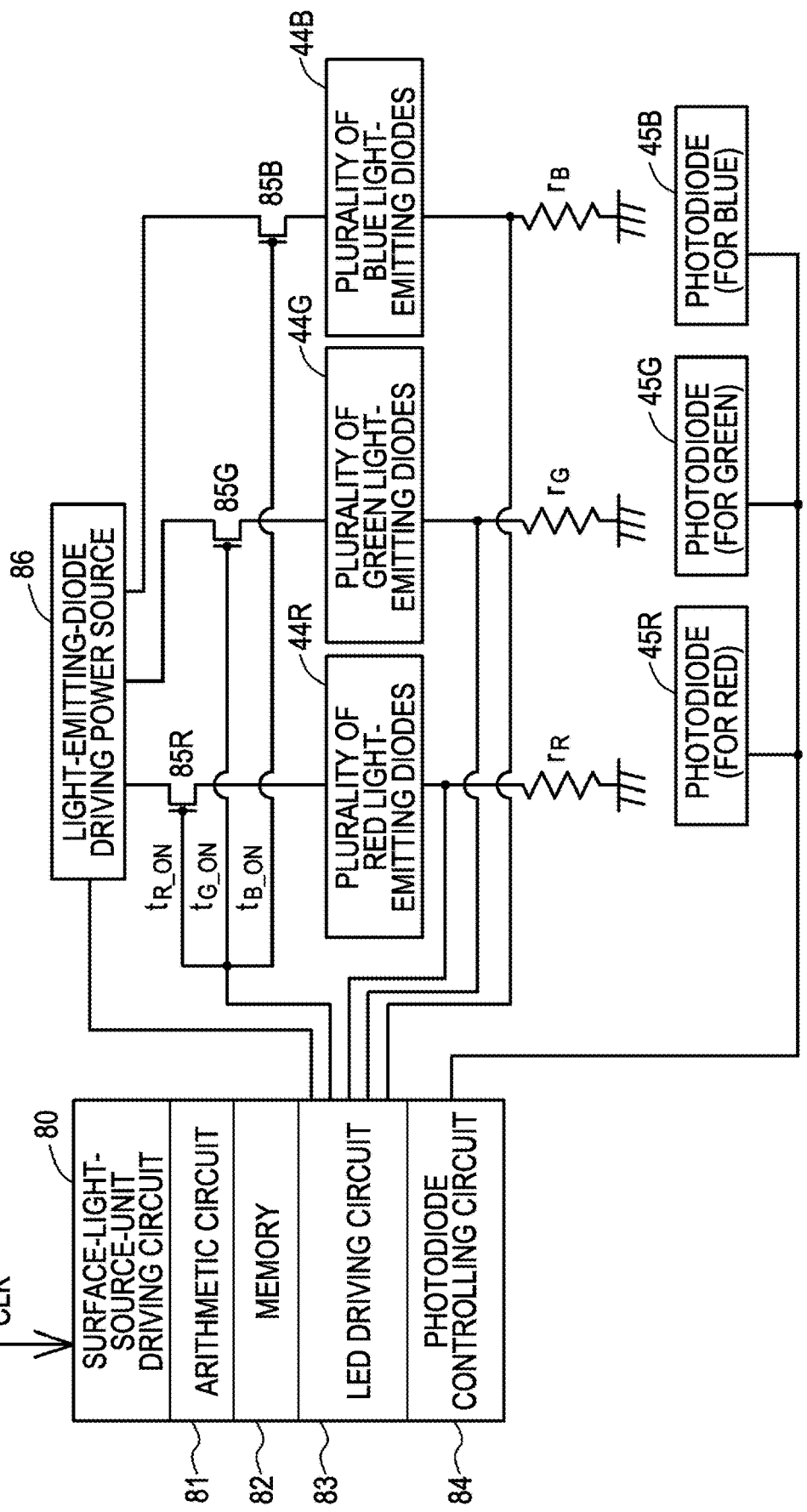
FIG. 6 is a conceptual diagram of a part of a driving circuit suitable for use in an embodiment of the present invention.

As shown in FIGS. 5 and 6, a driving circuit for driving the surface light source device 40 and the color liquid crystal display unit 10 on the basis of a driving signal from the outside (display circuit) includes a backlight controlling unit 70 and a surface-light-source unit driving circuit 80, which performs ON/OFF control of serially connected red light-emitting diodes 44R, serially connected green light-emitting diodes 44G, and serially connected blue light-emitting diodes 44B that constitute the light-emitting element units 43 in each surface light source unit 42 on the basis of the pulse-width modulation control method, and a liquid-crystal-display-unit driving circuit 90. The backlight controlling unit 70 includes an arithmetic circuit 71 and a memory 72. On the other hand, the surface-light-source unit driving circuit 80 includes an arithmetic circuit 81, a memory 82, an LED driving circuit 83, a photodiode controlling circuit 84, switching elements 85R, 85G, 85B made of FETs, and a light-emitting-diode driving power source (constant current source) 86. These circuits and the like constituting the backlight controlling unit 70 and the surface-light-source unit driving circuit 80 can be formed by known circuits and the like. On the other hand, the liquid-crystal-display-unit driving circuit 90 for driving the color liquid crystal display unit 10 is formed by a known circuit such as a timing controller 91. The color liquid crystal display unit 10 includes a gate driver, a source driver, and the like (which are not shown) for driving the switching elements 32 made of TFTs constituting the liquid crystal cells. A feedback mechanism is formed in which the light emission states of the light emitting diodes 44R, 44G, 44B in a given image display frame are measured by the photodiodes 45R, 45G, 45B, the outputs from the photodiodes 45R, 45G, 45B are inputted to the photodiode controlling circuit 84 and converted into data (signals) on the luminance and chromaticity of the light emitting diodes 44R, 44G, 44B, for example, in the photodiode controlling circuit 84 and the arithmetic circuit 81, and such data are sent to the LED driving circuit 83, thereby controlling the light emission states of the light emitting diodes 44R, 44G, 44B in the next image display frame. Further, on the downstream side of the light emitting diodes 44R, 44G, 44B, current detection resistors $r_R$, $r_G$, $r_B$ are inserted in series with the light emitting diodes 44R, 44G, 44B, currents flowing in the resistors $r_R$, $r_G$, $r_B$ are converted into voltages, and the operation of the lightemitting-diode driving power source (constant current source) 86 is controlled under the control of the LED driving circuit 83 so that a drop in voltage in each of the resistors $r_R$, $r_G$, $r_B$ becomes a predetermined value. Although FIG. 6 depicts one light-emitting-diode driving power source (constant current source) 86, in actuality, there are arranged a plurality of light-emitting-diode driving power sources 86 for driving the respective light emitting diodes 44R, 44G, 44B.

The display area 11 formed by pixels arranged in a two-dimensional matrix is divided into P×Q display area units. If this state is expressed in "rows" and "columns", it can be said that the display area 11 is divided into Q rows×P columns of display area units. Further, the display area unit 12 is formed by a plurality of (M×N) pixels. If this state is expressed in "rows" and "columns", it can be said that the display area unit 12 is formed by N rows×N columns of pixels. It should be noted that the display area unit and the surface light source unit that are arranged in a two-dimensional matrix and located in the q-th row and the p-th column [where q=1, 2, . . . , Q, and p=1, 2, . . . , P] are respectively expressed as a display area unit $12_{(q, p)}$ and a surface light source unit $42_{(q, p)}$, and a subscript "(q, p)" or "–(q, p)" will be often attached to an element or item relating to the display area unit $12_{(q, p)}$ or the surface light source unit $42_{(q, p)}$. Here, the red light-emitting sub pixel (sub pixel [R]), the green light-emitting sub pixel (sub pixel [G]), and blue light-emitting sub pixel (sub pixel [B]) will be often collectively referred to as "sub pixels [R, G, B]". A red light emission controlling signal, a green light emission controlling signal, and a blue light emission controlling signal, which are inputted to the sub pixels [R, G, B] for the control of the operations of the sub pixels [R, G, B] (specifically, for example, the control of light transmittance (aperture ratio)), will be often collectively referred to as "control signals [R, G, B]". A red light-emitting sub pixel driving signal, a green light-emitting sub pixel driving signal, and a blue-light-emitting-sub-pixel driving signal, which are inputted from the outside to the drive circuit to drive the sub pixels [R, G, B] constituting the display area unit, will be often collectively referred to as "driving signals [R, G, B]".

Each pixel includes a set of three sub pixels including the sub pixel [R] (red light-emitting sub pixel), the sub pixel [G] (green light-emitting sub pixel), and the sub pixel [B] (blue light-emitting sub pixel). In the following description of embodiments, the control (gray level control) of the luminance of each of the sub pixels [R, G, B] is set as 8-bit control in $2^8$ steps from 0 to 255. Therefore, each of the values $x_R$, $x_G$, $x_B$ of the driving signals [R, G, B], which are inputted to the liquid-crystal-display-unit driving circuit 90 to drive the respective sub pixels [R, G, B] in each of pixels constituting each display area unit 12, takes a value in $2^8$ steps. Further, each of the values $S_R$, $S_G$, $S_B$ of pulse-width modulation output signals for controlling the respective light emission times of the red light-emitting diode 44R, green light-emitting diode 44G, and blue light-emitting diode 44B constituting each surface light source unit also takes a value in $2^8$ steps from 0 to 255. However, this should not be construed restrictively. For example, the control may be set as 10-bit control in $2^{10}$ steps from 0 to 1023, in which case the 8-bit numerical values may be increased by 4 times, for example.

A control signal for controlling the light transmittance Lt of each of the pixels is supplied to each of the pixels from the driving circuit. Specifically, the control signals [R, G, B] for controlling the respective light transmittances Lt of the sub pixels [R, G, B] are supplied to the respective sub pixels [R, G, B]. That is, in the liquid-crystal-display-unit driving circuit 90, control signals [R, G, B] are generated from inputted driving signals [R, G, B], and the control signals [R, G, B] are supplied (outputted) to the sub pixels [R, G, B]. It should be noted that since the light source luminance $Y_2$ of the surface light source unit 42 is changed for every one image display frame, basically, the control signals [R, G, B] each has a value obtained by performing correction (compensation) based on changes in light source luminance $Y_2$, with respect to a value obtained by raising the value of each of the driving signals [R, G, B] to the 2.2th power. Further, the control signals [R, G, B] are sent by a known method to the gate driver and source driver of the color liquid crystal display unit 10 from the timing controller 91 constituting the liquid-crystal-display-unit driving circuit 90, the switching element 32 constituting each sub pixel is driven on the basis of the control signals [R, G, B], and a desired voltage is applied to each of the first transparent electrode 24 and second transparent electrode 34 that constitute the liquid crystal cell, thereby controlling the light transmittance (aperture ratio) of each sub pixel. In this case, as the values of the control signals [R, G, B] become larger, the light transmittances of the sub pixels [R, G, B] (the aperture ratios of the sub pixels) Lt become higher, and the luminances (display luminances y) of the sub pixels [R, G, B] become higher. That is, an image (normally, a kind of spot-like image) formed by light passing through the sub pixels [R, G, B] is bright.

The control of the display luminance y and light source luminance $Y_2$ is performed for every one image display frame, every one display area unit, and every one surface light source unit in the image display of the color liquid crystal 10. Further, the operation of the color liquid crystal display unit 10 and the operation of the surface light source device 40 within one image display frame are synchronized with each other. It should be noted that the number of pieces of image information (images-per-second) sent to the driving circuit as electrical signals within one second is the frame frequency (frame rate), and the inverse of the frame frequency is the frame time (unit: second).

Embodiment 1

Embodiment 1 relates to the surface light source device according to each of the first to third aspects of the present invention.

Figure 3:
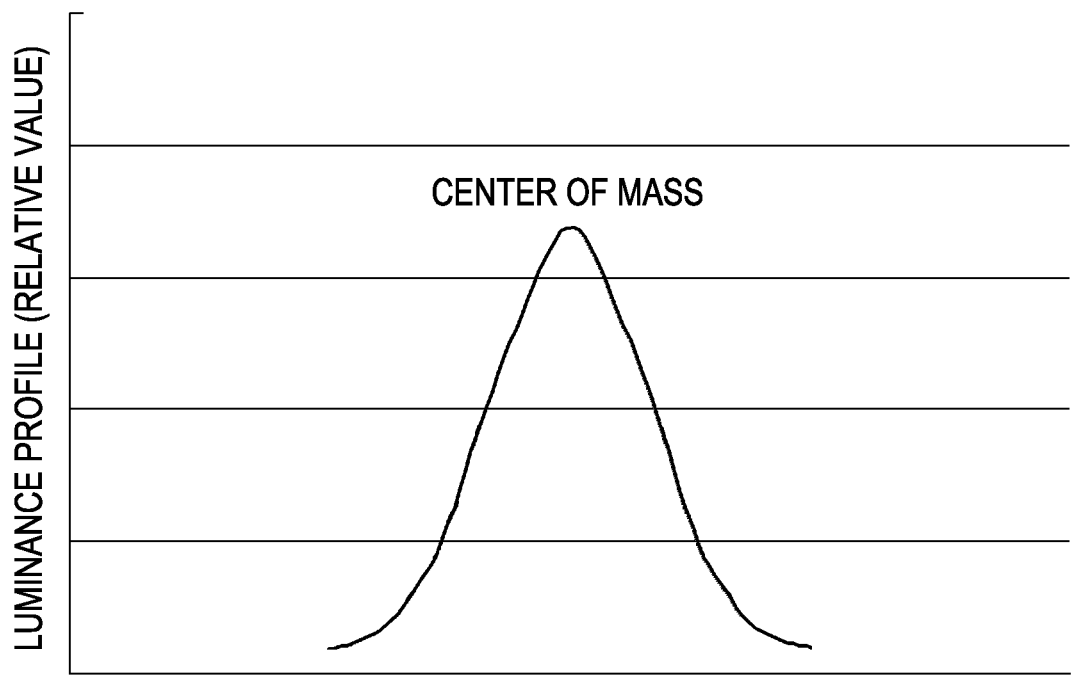
FIG. 3 is a graph schematically showing an example of a luminance profile.

That is, in the surface light source device 40 according to Embodiment 1, in each surface light source unit $42_{(q, p)}$ the center of mass of a luminance profile based on a plurality of red light-emitting elements (red light-emitting diodes 44R) substantially coincides with the center of mass of the surface light source unit $42_{(q, p)}$ the center of mass of a luminance profile based on a plurality of green light-emitting elements (green light-emitting diodes 44G) substantially coincides with the center of mass of the surface light source unit $42_{(q, p)}$ and further, the center of mass of a luminance profile based on a plurality of blue light-emitting elements (blue light-emitting diodes 44B) substantially coincides with the center of mass of the surface light source unit $42_{(q, p)}$. It should be noted that one example of luminance profile is schematically shown in the graph of FIG. 3.

Alternatively, in the surface light source device 40 according to Embodiment 1, in each surface light source unit $42_{(q, p)}$ the center of mass of the positions of a plurality of red light-emitting elements (red light-emitting diodes 44R) substantially coincides with the center of mass of the surface light source unit $42_{(q, p)}$ the center of mass of the positions of a plurality of green light-emitting elements (green light-emitting diodes 44G) substantially coincides with the center of mass of the surface light source unit $42_{(q, p)}$ and the center of mass of the positions of a plurality of blue light-emitting elements (blue light-emitting diodes 44B) substantially coincides with the center of mass of the surface light source unit $42_{(q, p)}$.

It should be noted that when the light emission characteristics of the plurality of red light-emitting elements (red light-emitting diodes 44R) are the same, the center of mass of the luminance profile based on the plurality of red light-emitting elements (red light-emitting diodes 44R), and the center of mass of the positions of the plurality of red light-emitting elements (red light-emitting diodes 44R) substantially coincide with the center of mass of the surface light source unit $42_{(q, p)}$. Further, when the light emission characteristics of the plurality of green light-emitting elements (green light-emitting diodes 44G) are the same, the center of mass of the luminance profile based on the plurality of green light-emitting elements (green light-emitting diodes 44G), and the center of mass of the positions of the plurality of green light-emitting elements (green light-emitting diodes 44G) substantially coincide with the center of mass of the surface light source unit $42_{(q, p)}$. Further, when the light emission characteristics of the plurality of blue light-emitting elements (blue light-emitting diodes 44B) are the same, the center of mass of the luminance profile based on the plurality of blue light-emitting elements (blue light-emitting diodes 44B), and the center of mass of the positions of the plurality of blue light-emitting elements (blue light-emitting diodes 44B) substantially coincide with the center of mass of the surface light source unit $42_{(q, p)}$.

Further, in the surface light source device 40 according to Embodiment 1, in each surface light source unit $42_{(q, p)}$ at least one red light-emitting element 44R, at least one green light-emitting element 44G, and at least one blue light-emitting element 44B are arranged along the side of the surface light source unit $42_{(q, p)}$ and the red light-emitting element 44R, the green light-emitting element 44G, and the blue light-emitting element 44B are arranged in the same order along the four sides of the surface light source unit $42_{(q, p)}$.

More specifically, according to Embodiment 1, one light source unit $42_{(q, p)}$ includes four light-emitting element units 43. Further, in one surface light source unit $42_{(q, p)}$ the respective red light-emitting elements 44R constituting the four light-emitting element units 43 are arranged four-rotation symmetrically, the respective green light-emitting elements 44G constituting the four light-emitting element units 43 are arranged four-rotation symmetrically, and the respective blue light-emitting elements 44B constituting the four light-emitting element units 43 are arranged four-rotation symmetrically.

Figure 1A:
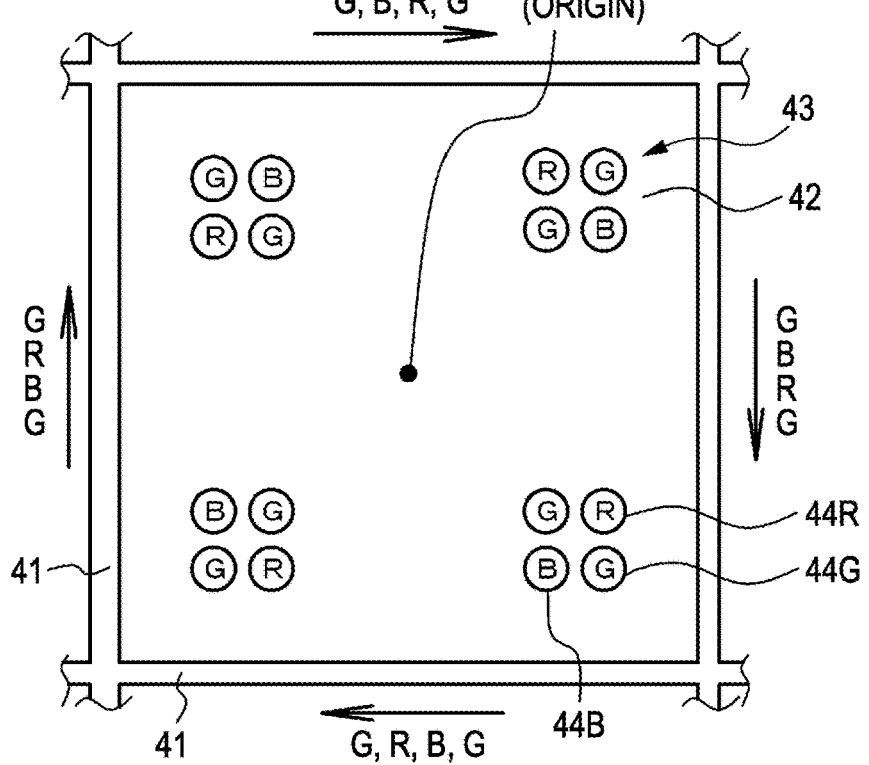
FIGS. 1A and 1B are views schematically showing the arrangement of light emitting elements constituting a light-emitting element unit according to Embodiment 1.
Figure 1B:
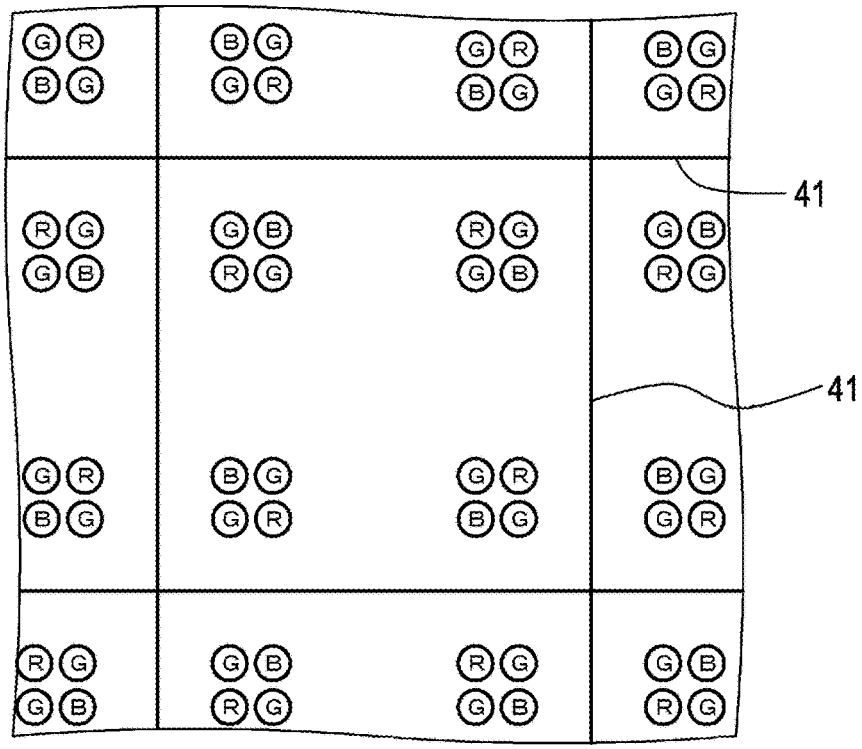

That is, as shown in the schematic placement/arrangement of FIGS. 1A and 1B, each light-emitting element unit 43 includes one red light-emitting element 44R, two green green-emitting elements 44G, and one blue light-emitting element 44B. Further, these four light emitting elements 44R, 44G, 44B are arranged at the four corners of an imaginary rectangle. When assuming a coordinate system whose origin lies at the center of mass of the surface light source unit $42_{(q, p)}$ the green light-emitting elements 44G are arranged at one of the four corners of the imaginary rectangle located closest to the origin, and at one of the four corners of the imaginary rectangle located farthest from the origin, and the red light-emitting element 44R and the blue light-emitting element 44B are respectively arranged at the two remaining corners. Further, the arrangement order of the red light-emitting elements 44R, the green light-emitting elements 44G, and the blue light-emitting elements 44B in the four sides of the surface light source unit $42_{(q, p)}$ is such that when moving along the four sides of the surface light source unit $42_{(q, p)}$ clockwise around the center of mass of the surface light source unit $42_{(q, p)}$ in all of the sides, the light-emitting elements 44R, 44G, 44B are arranged in the order of the green light-emitting element 44G, the blue light-emitting element 44B, the red the green light-emitting element 44R, and the green light-emitting element 44G. It should be noted that the sides of the imaginary rectangle are in parallel to the sides of the surface light source unit.

Further, as shown in the drawing of placement/arrangement in FIG. 1B, while one red light-emitting element 44R, two green light-emitting elements 44G, and one blue light-emitting element 44B are arranged along one side of one surface light source unit $42_{(q, p)}$ light emitting elements of the same color are not arranged adjacent to each other along one side of one surface light source unit $42_{(q, p)}$. Further, when viewed along the sides of two adjacent surface light source units [with the surface light source unit $42_{(q, p)}$ taken as the center, a surface light source unit $42_{(q-1, p)}$, a surface light source unit $42_{(q+1, p)}$, a surface light source unit $42_{(q, p-1)}$, and a surface light source unit $42_{(q, p+1)}$] as well, the arrangement order of the red light-emitting elements 44R, the green light-emitting elements 44G, and the blue light-emitting elements 44B is the same among the respective sides.

Figure 4:
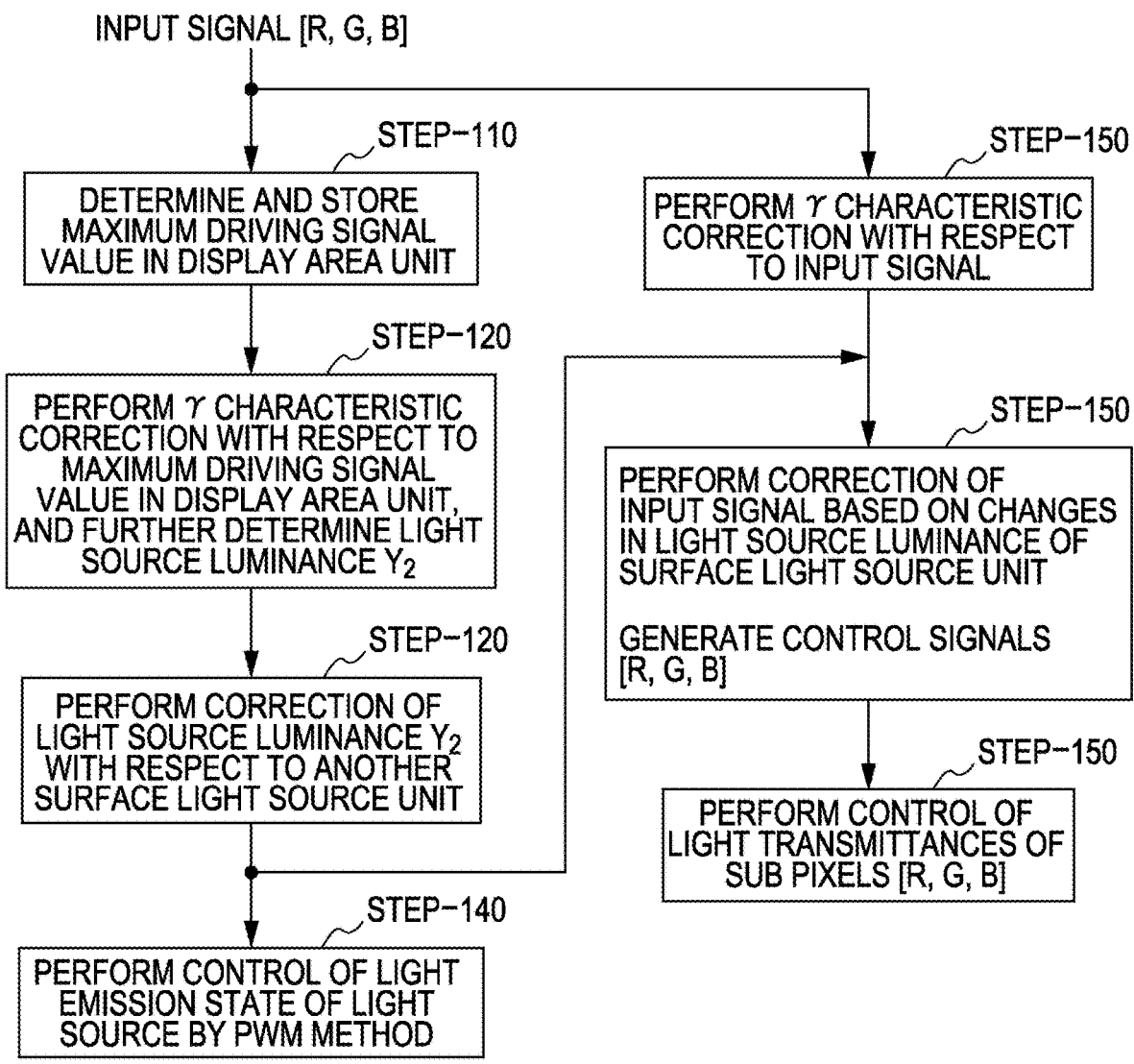
FIG. 4 is a flow chart illustrating a method of driving a liquid crystal display unit assembly according to Embodiment 1.

A method of driving the liquid crystal display unit assembly according to Embodiment 1 will now be described with reference to FIGS. 5 and 6, and the flow chart of FIG. 4.

[Step-100]

Driving signals [R, G, B] and a clock signal CLK corresponding to one image display frame sent from a known display circuit such as a scan converter are inputted to the backlight controlling unit 70 and the liquid-crystal-display-unit driving circuit 90 (see FIG. 5). It should be noted that with the input light quantity to an image pickup tube given as y', for example, the driving signals [R, G, B] are output signals from the image pickup tubes, which are outputted from, for example, broadcasting stations or the like and are inputted also to the liquid-crystal-display-unit driving circuit 90 to control the light transmittance Lt of pixels, and can be expressed as a function of the 0.45th power of the input light quantity y'. Further, the values $x_R$, $x_G$, $x_B$ of the driving signals [R, G, B] corresponding to one image display frame inputted to the backlight controlling unit 70 are temporarily stored into the memory 72 constituting the backlight controlling unit 70. Further, the values $x_R$, $x_G$, $x_B$ of the driving signals [R, G, B] corresponding to one image display frame inputted to the liquid-crystal-display-unit driving circuit 90 are also temporarily stored into a memory (not shown) constituting the liquid-crystal-display-unit driving circuit 90.

[Step-110]

Next, in the arithmetic circuit 71 constituting the backlight controlling unit 70, the values of the driving signals [R, G, B] stored in the memory 72 are read, and with respect to the (p, q)-th [where, first, p=1, q=1] display area unit $12_{(q, p)}$, a maximum driving signal value $x_{U-max(q, p)}$ in a display area unit, which represents the maximum value among the values $x_{R-(q, p)}$, $x_{G-(q, p)}$, $x_{B-(q, p)}$ of driving signals [R, G, B]$_{(q, p)}$ for driving the sub pixels [R, G, B]$_{(q, p)}$ in all of the pixels constituting the (p, q)-th display area unit $12_{(q, p)}$, is determined by the arithmetic circuit 71. Then, the maximum driving signal value $x_{U-max(q, p)}$ in a display area unit is stored into the memory 72. This step is executed with respect to all the cases of m=1, 2, ..., M, n=1, 2, ..., N, that is, with respect to M×N pixels.

For example, if $x_{R-(q, p)}$ is a value corresponding to "110", $x_{G-(q, p)}$ is a value corresponding to "150", $x_{B-(q, p)}$ is a value corresponding to "50", then $x_{U-max(q, p)}$ is a value corresponding to "150".

This operation is repeated from (p, q)=(1, 1) to (P, Q), and the maximum driving signal value $x_{U-max(q, p)}$ in a display area unit in each of the display area units $12_{(q, p)}$ is stored into the memory 72.

[Step-120]

Figure 9A:
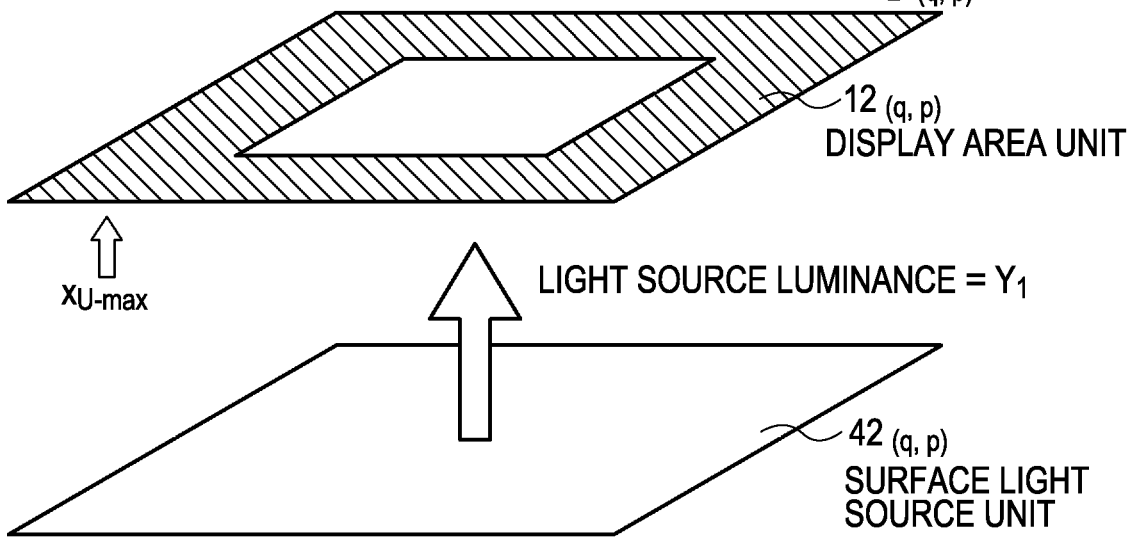
FIGS. 9A and 9B are conceptual views illustrating a state in which the light source luminance $Y_2$ of a surface light source unit is increased/decreased under the control of a surface-light-source-unit driving circuit so that a second specified display-luminance value $y_2$, which would be obtained by assuming that a control signal corresponding to a driving signal having a value equal to a maximum driving signal value $x_{U\text{-}max}$ in a display area unit has been supplied to a pixel, is obtained by the surface light source unit.
Figure 9B:
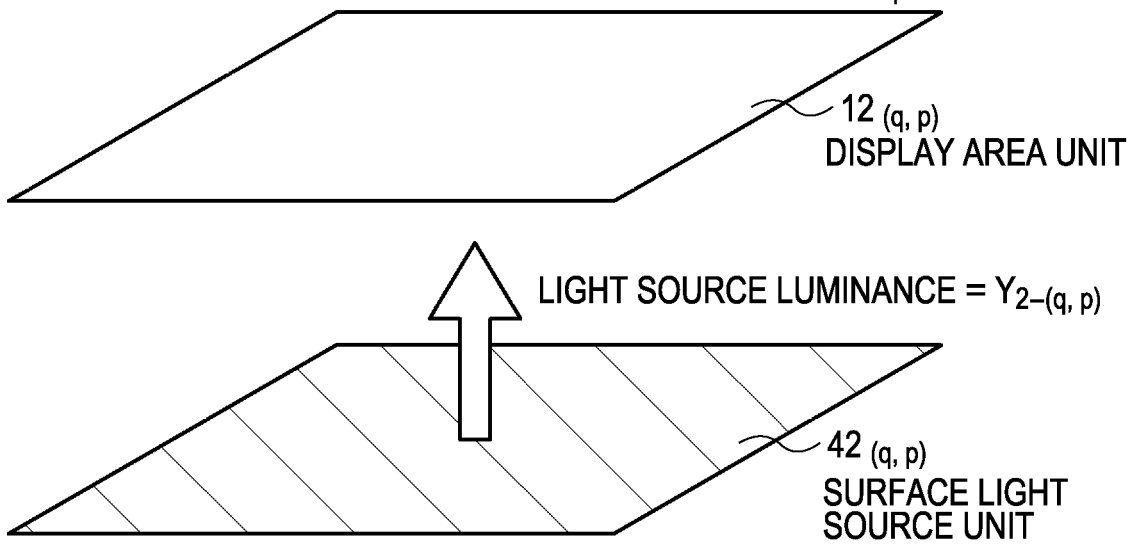

Then, the light source luminance $Y_{2-(q, p)}$ of the surface light source unit $42_{(q, p)}$ corresponding to the display area unit $12_{(q, p)}$ is increased/decreased under the control of the surface-light-source-unit driving circuit $80_{(q, p)}$ in such a way that a luminance (second specified display-luminance value $Y_{2-(q, p)}$ at the first specified light-transmittance value $Lt_1$) that would be obtained by assuming that the control signals [R, G, B]$_{(q, p)}$ corresponding to the driving signals [R, G, B]$_{(q, p)}$ each having a value equal to the maximum driving signal value $x_{U-max(q, p)}$ in a display unit area have been supplied to the sub pixels [R, G, B]$_{(q, p)}$ can be obtained by the surface light source unit $42_{(q, p)}$. Specifically, this can be achieved by controlling the light source luminance $Y_2$ for every one image display frame and every one surface light source unit so that Equation (1) below is satisfied. More specifically, this can be achieved by controlling the luminance of the light-emitting element unit 43 on the basis of Equation (2) that is a light source luminance control function g ($x_{nol-max}$), and controlling the light source luminance $Y_2$ of the light-emitting element unit 43 so that Equation (1) is satisfied. A conceptual illustration of such control is shown in FIGS. 9A and 9B. However, as will be described later, it is necessary to perform correction based on the influences of other surface light source units 42 and the like with respect to the light source luminance $Y_2$. These relationships relating to the control of the light source luminance $Y_2$, that is, the relationships between the maximum driving signal value $x_{U-max}$ in a display area unit, the value of a control signal corresponding to a driving signal having a value equal to the maximum value $x_{U-max}$, the second specified display-luminance value $y_2$ that would be obtained by assuming that such a control signal has been supplied to a pixel (sub pixel), the light transmittance (aperture ratio) [second specified light-transmittance value $Lt_2$] of each sub pixel at this time, luminance control parameters in the surface light source unit that allow the second specified display-luminance value $Y_2$ to be obtained when the light transmittance (aperture ratio) of each sub pixel is set at the first specified light-transmittance value $Lt_1$, may be previously determined and stored into the memory 72 or the like.

$$Y_2 \cdot Lt_1 = Y_1 \cdot Lt_1 \tag{1}$$

$$g(x_{nol-max}) = a_1 \cdot (x_{nol-max})^{22} + a_0 \tag{2}$$

Here, assuming that the maximum value of driving signals (driving signals [R, G, B]) inputted to the liquid-crystal-display-unit driving circuit 90 for driving pixels (or respective sub pixels [R, G, B] constituting the pixels) is $x_{max}$, then $$x_{nol-max} = x_{U-max}/x_{max},$$

and $a_1$, $a_0$ are constants, and can be represented as follows:

$$a_1 + a_0 = 1$$

$$0 < a_0 < 1, \ 0 < a_1 < 1.$$

For example, $a_1$, $a_0$ may be set as $$a_1 = 0.99, \text{ and}$$

$$a_0 = 0.01.$$

Further, since each of the values $x_R$, $x_G$, $x_B$ of the driving signals [R, G, B] takes a value in 2 steps, the value $x_{max}$ is a value corresponding to "255".

Incidentally, in the surface light source device 40, assuming a case where the luminance of a surface light source unit $42_{(1, 1)}$ of (p, q)=(1, 1) is to be controlled, for example, it is necessary to take the influences from the other P×Q surface light source units 42 into consideration. Since such influences exerted on the surface light source unit 42 from the other surface light units 42 are previously found from the light emission profile of each surface light source unit 42, a difference can be calculated by the inverse operation and, as a result, correction is possible. The basic form of computation will be described below.

The luminance (light source luminance $Y_2$) required for the P×Q surface light source units 42 on the basis of the requirements of Equations (1) and (2) is represented by a matrix [$L_{P \times Q}$]. Further, the luminance of the surface light source unit obtained when only a given surface light source unit is driven and other surface light source units are not driven is determined in advance for the P×Q surface light source units 42. Such a luminance is represented by a matrix [L'$_{P \times Q}$]. Further, the correction coefficient is represented by [($\alpha_{P \times Q}$)]. Then, the relationship between these matrices can be represented by Equation (3-1) below. The matrix [($\alpha_{P \times Q}$)] of the correction coefficient can be determined in advance.

$$[L_{P \times Q}] = [L'_{P \times Q}] \cdot [\alpha_{P \times Q}] \tag{3-1}$$

Accordingly, [L'$_{P \times Q}$] may be determined from Equation (3-1). The matrix [L'$_{P \times Q}$] can be determined from the computation of inverse matrix. That is, the following may be calculated:

$$[L'_{P \times Q}] = [L_{P \times Q}] \cdot [\alpha_{P \times Q}]^{-1} \tag{3-2}$$

Then, light sources (the plurality of light-emitting element units 43) included in the respective surface light source units $42_{(q, p)}$ may be controlled so that the luminance represented by the matrix [L'$_{P \times Q}$] is obtained. Specifically, such operation and processing may be performed by using information (data table) stored in the memory 82. It is needless to mention that in controlling the plurality of light-emitting element units 43, since the value of the matrix [L'$_{P \times Q}$] cannot take a negative value, it is necessary to keep the computation result within a positive range. Therefore, there may be cases where the solution of Equation (3-2) is not an exact solution but an approximate solution.

In this way, on the basis of the matrix [$L_{P \times Q}$] obtained on the basis of the values of Equations (1) and (2) obtained in the arithmetic circuit 71 constituting the backlight controlling unit 70, and the matrix [$\alpha_{P \times Q}$] of the correction coefficient, in the manner as described above, the matrix [L'$_{P \times Q}$] of the luminance that would be obtained by assuming that the surface light source unit is driven independently is determined, followed by conversion into a corresponding one of integers within the range of 1 to 255 on the basis of a conversion table stored in the memory 72. In this way, in the arithmetic circuit 71 constituting the backlight controlling unit 70, the value $S_{R-(q, p)}$ of a pulse-width modulation output signal for controlling the light emission time of the red light-emitting diode 44R, the value $S_{G-(q, p)}$ of a pulse-width modulation output signal for controlling the light emission time of the green light-emitting diode 44G, and the value $S_{B-(q, p)}$ of a pulse-width modulation output signal for controlling the light emission time of the blue light-emitting diode 44B in the surface light source unit $42_{(q, p)}$ can be obtained.

[Step-130]

Next, the values $S_{R-(q, p)}$, $S_{G-(q, p)}$, $S_{B-(q, p)}$ of the pulse-width modulation output signals obtained in the arithmetic circuit 71 constituting the backlight controlling unit 70 are sent to the memory 82 of the surface-light-source-unit driving circuit $80_{(q, p)}$ provided in correspondence to the surface light source unit $42_{(q, p)}$, and stored into the memory 82. Further, the clock signal CLK is also sent to the surface-light-source-unit driving circuit $80_{(q, p)}$ (see FIG. 6).

[Step-140]

Then, on the basis of the values $S_{R-(q, p)}$, $S_{G-(q, p)}$, $S_{B-(q, p)}$ of the pulse-width modulation output signals, the arithmetic circuit 81 determines the ON time $t_{R-ON}$ and OFF time $t_{R-OFF}$ of the red light-emitting diode 44R constituting the surface light source unit $42_{(q, p)}$, the ON time $t_{G-ON}$ and OFF time $t_{G-OFF}$ of the green light-emitting diode 44G, and the ON time $t_{B-ON}$ and OFF time $t_{B-OFF}$ of the blue light-emitting diode 44B.

It should be noted that $t_{R-ON} + t_{R-OFF} = t_{G-ON} + t_{G-OFF} = t_{B-ON} + t_{B-OFF}$ = constant value $t_{Const}$. Further, the duty ratio in the drive based on the pulse-width modulation of the light emitting diode can be represented by $$t_{ON}/(t_{ON} + t_{OFF}) = t_{ON}/t_{Const}.$$

Further, signals corresponding to the ON times $t_{R-ON-(q, p)}$, $t_{G-ON-(q, p)}$, $t_{B-ON-(q, p)}$ of the red light-emitting diode 44R, green light-emitting diode 44G, and blue light-emitting diode 44B that constitute the surface light source unit $42_{(q, p)}$ are sent to the LED driving circuit 83, and on the basis of the values of signals corresponding to the ON times $t_{R-ON-(q, p)}$, $t_{G-ON-(q, p)}$, $t_{B-ON-(q, p)}$ the switching elements $85R_{(q, p)}$, $85G_{(q, p)}$, $85B_{(q, p)}$ are turned ON by the LED driving circuit 83 for the durations of the ON times $t_{R-ON-(q, p)}$, $t_{G-ON-(q, p)}$, $t_{B-ON-(q, p)}$, so the LED driving current from the light-emitting-diode driving power source 86 is passed to each of the light emitting diodes 44R, 44G, 44B. As a result, in one image display frame, the respective light emitting diodes 44R, 44G, 44B emit light for the durations of the ON times $t_{R-ON-(q, p)}$, $t_{G-ON-(q, p)}$, $t_{B-ON-(q, p)}$, thereby illuminating the (p, q)-th display area unit $12_{(q, p)}$ at a predetermined illuminance.

Figure 10A:
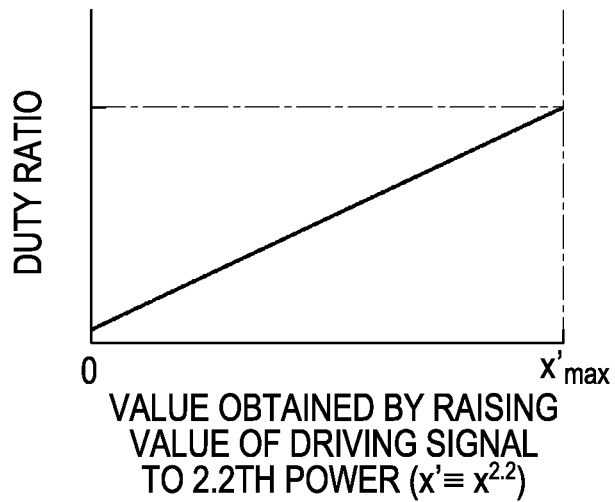
FIG. 10A is a diagram schematically showing the relationship between a duty ratio ($=t_{ON}/t_{Const}$) and a value ($x'\equiv x^{2.2}$) obtained by raising the value of a driving signal, which is inputted to a liquid-crystal-display-unit driving circuit for driving sub pixels, to the 2.2th power.
Figure 10B:
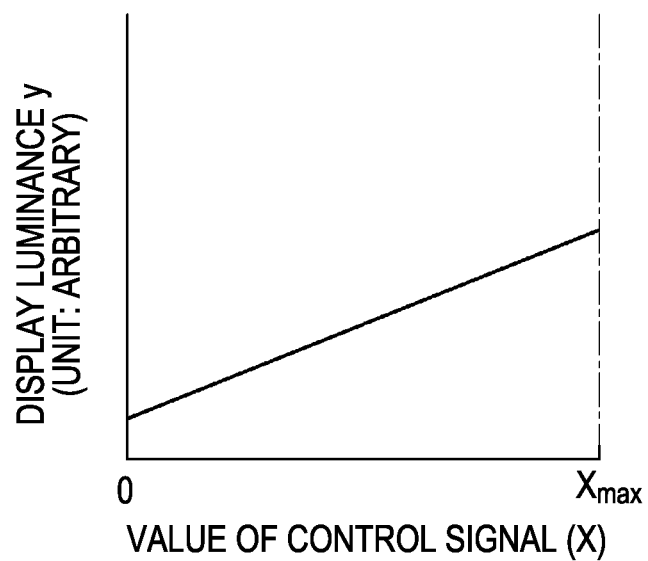
FIG. 10B is a diagram schematically showing the relationship between a display luminance y and the value X of a control signal for controlling the light transmittance of sub pixels.
Figure 11A:
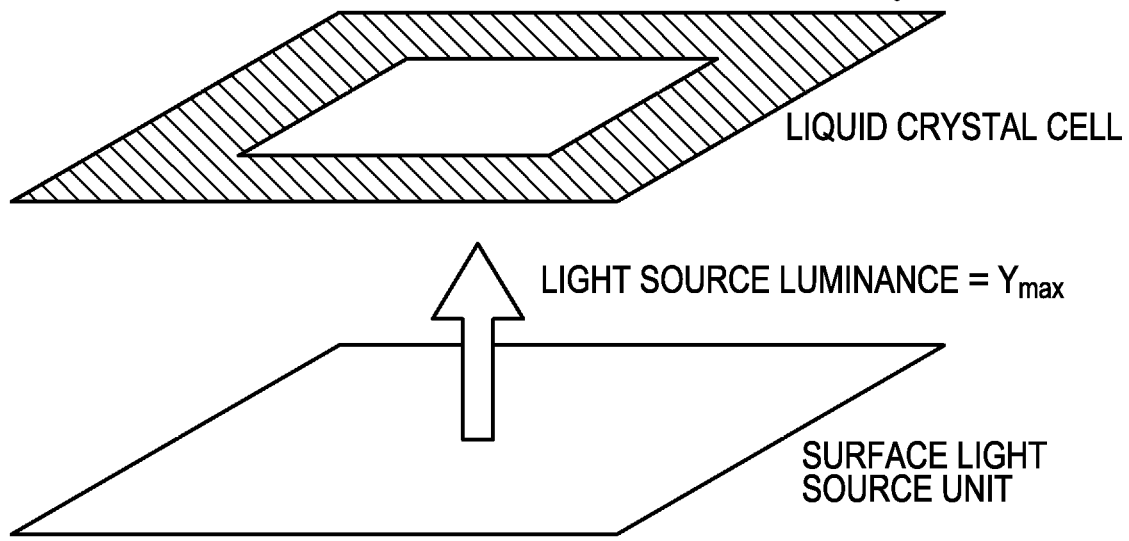
FIGS. 11A and 11B are conceptual views illustrating the relationship between the light source luminance of a surface light source device, the light transmittance (aperture ratio) of pixels, and the display luminance in a display area.
Figure 11B:
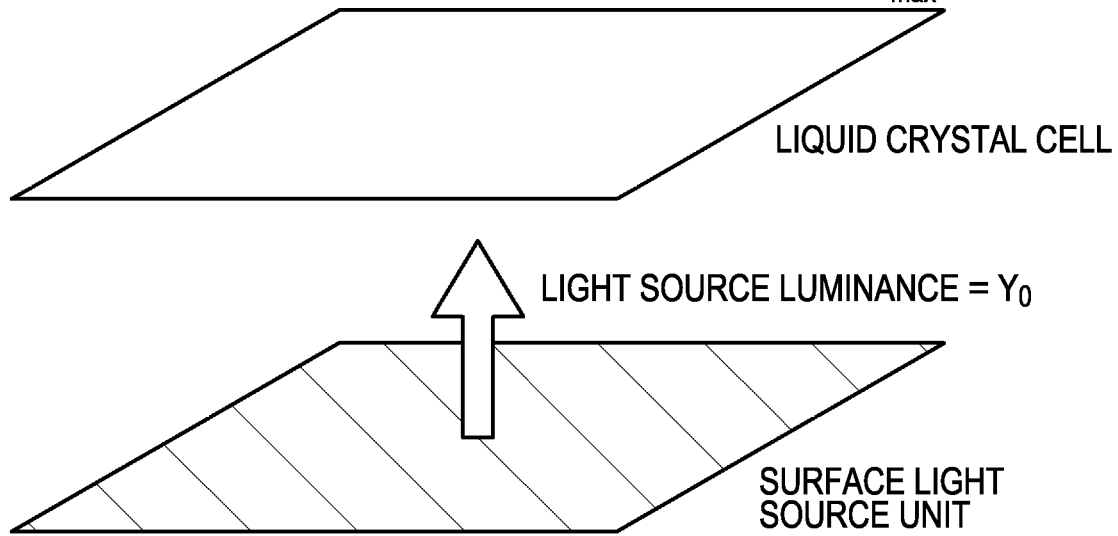
Figure 12A:
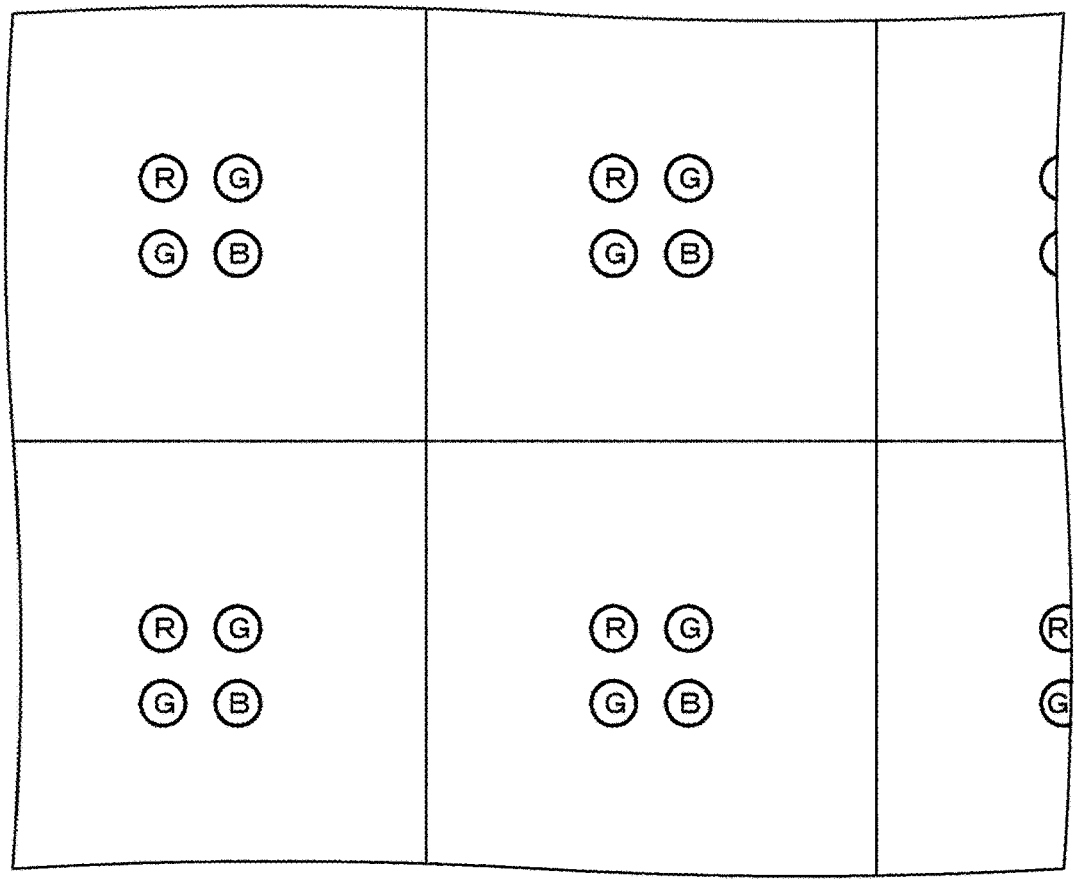
FIGS. 12A and 12B are respectively a view showing the arrangement of four light emitting diodes disclosed in Japanese Unexamined Patent Application Publication No. 2005-258403, and a view schematically showing how local variation in luminescent color (shift of luminescent color) occurs in the outer edge area of a surface light source unit.
Figure 12B:
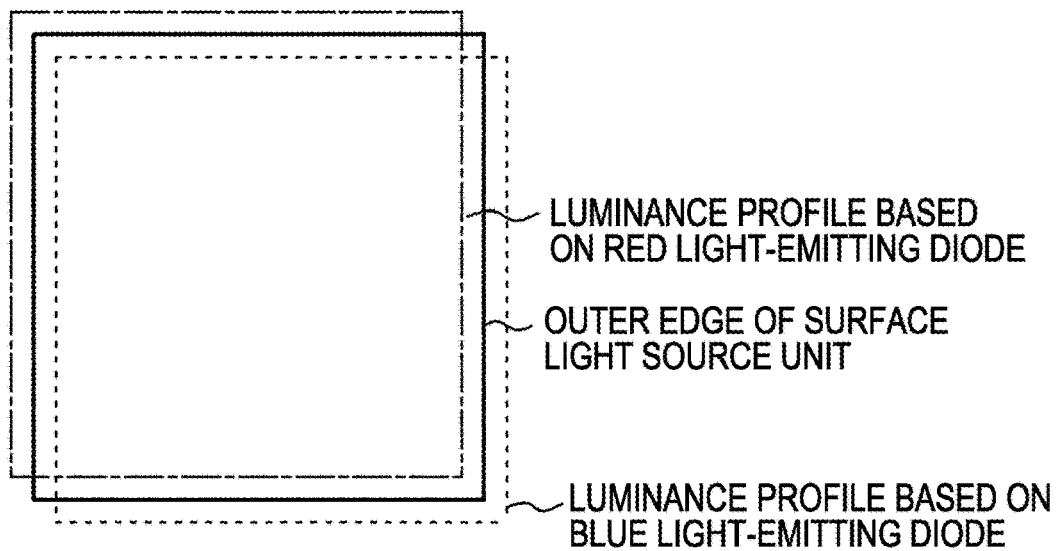
Figure 13A:
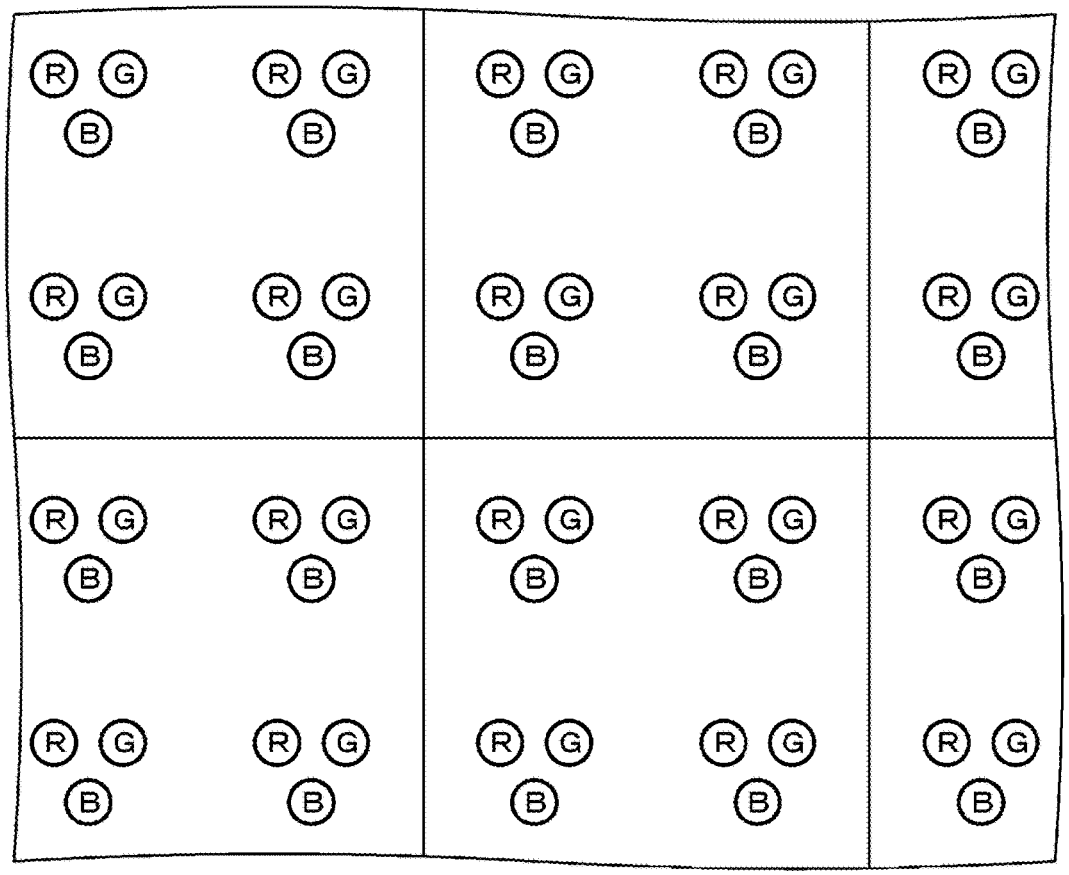
FIGS. 13A and 13B are respectively a view showing the arrangement of light emitting diodes in a surface light source device according to the related art, and a view schematically showing how local variation in luminescent color (shift of luminescent color) occurs in the outer edge area of a portion corresponding to a surface light source unit.
Figure 13B:
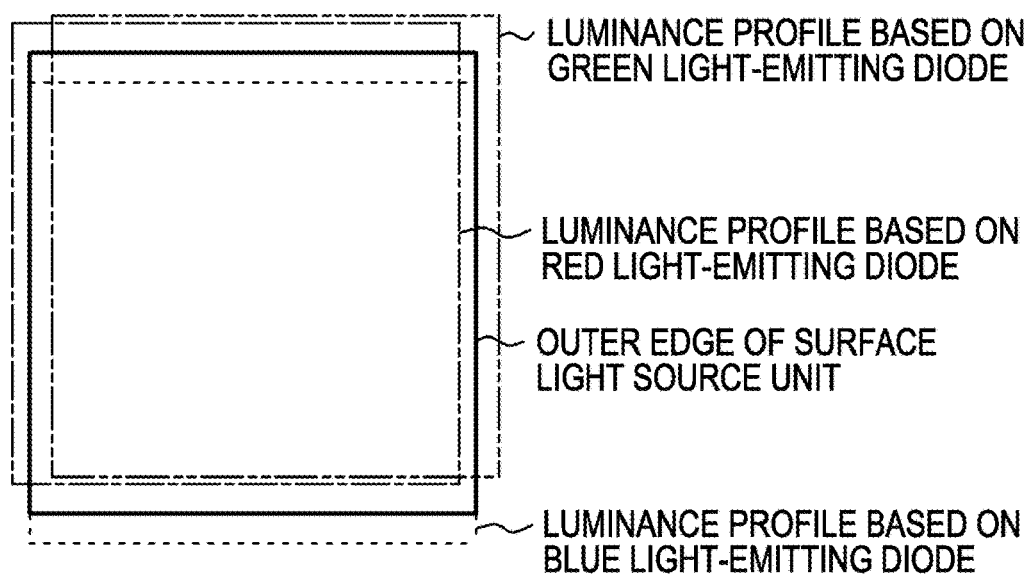
Figure 14A:
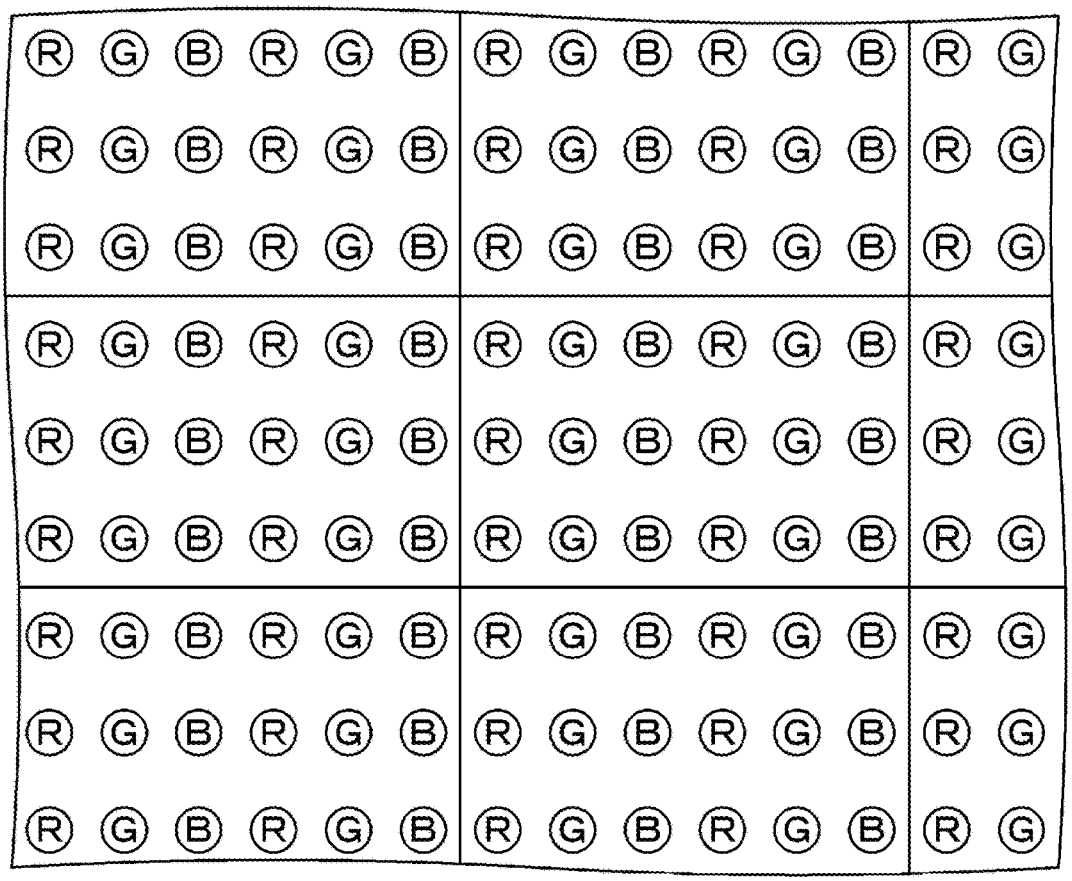
FIGS. 14A and 14B are respectively a view showing the arrangement of light emitting diodes in another surface light source device according to the related art, and a view schematically showing how local variation in luminescent color (shift of luminescent color) occurs in the outer edge area of a portion corresponding to a surface light source unit.
Figure 14B:
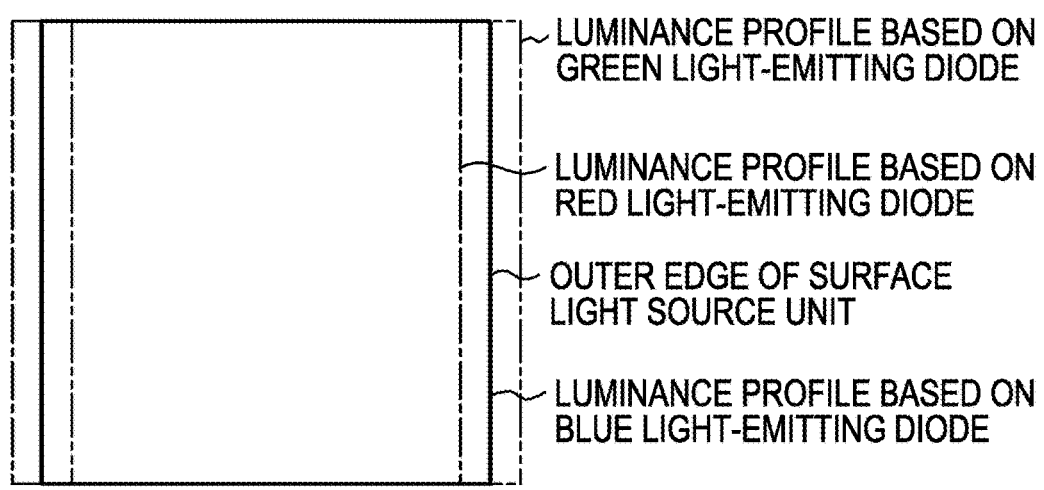

The states thus obtained are indicated by solid lines in FIGS. 10A and 10B. FIG. 10A is a diagram schematically showing the relationship between a duty ratio ($= t_{ON}/t_{Const}$) and a value ($x' \equiv x^{2.2}$) obtained by raising the value of a driving signal, which is inputted to the liquid-crystal-display-unit driving circuit 90 for driving sub pixels, to the 2.2th power. FIG. 10B is a diagram schematically showing the relationship between a display luminance y and the value X of a control signal for controlling the light transmittance Lt of sub pixels.

[Step-150]

On the other hand, the values $x_{R-(q, p)}$, $x_{G-(q, p)}$, $x_{B-(q, p)}$ of the driving signals [R, G, B]$_{(q, p)}$ inputted to the liquid-crystal-display-unit driving circuit 90 are sent to the timing controller 91, and control signals [R, G, B]$_{(q, p)}$ corresponding to the inputted driving signals [R, G, B]$_{(q, p)}$ are supplied (outputted) to the sub pixels [R, G, B]$_{(q, p)}$. The values $X_{R-(q, p)}$, $X_{G-(q, p)}$, $X_{B-(q, p)}$ of the control signals [R, G, B]$_{(q, p)}$ generated by the timing controller 91 of the liquid-crystal-display-unit driving circuit 90 and supplied from the liquid-crystal-display-unit driving circuit 90 to the sub pixels [R, G, B]$_{(q, p)}$, and the values $x_{R-(q, p)}$, $x_{G-(q, p)}$, $x_{B-(q, p)}$ of the driving signals [R, G, B]$_{(q, p)}$ have the relationships represented by Equation (4-1), Equation (4-2), Equation (4-3) below, where $b_{1\_R}$, $b_{0\_R}$, $b_{1\_G}$, $b_{0\_G}$, $b_{1\_B}$, $b_{0\_B}$ are constants. It should be noted that since the light source luminance $Y_{2-(q, p)}$ of the surface light source unit $42_{(q, p)}$ is changed for every one image display frame, basically, the control signals [R, G, B]$_{(q, p)}$ each has a value obtained by performing correction (compensation) based on changes in light source luminance $Y_{2-(q, p)}$, with respect to a value obtained by raising the value of each of the driving signals [R, G, B]$_{(q, p)}$ to the 2.2th power. That is, in Embodiment 1, since the light source luminance $Y_{2-(q, p)}$ changes for every one image display frame, the values $X_{R-(q, p)}$, $X_{G-(q, p)}$, $X_{B-(q, p)}$ of the control signals [R, G, B]$_{(q, p)}$ are determined and corrected (compensated) so that a second specified display-luminance value $Y_{2-(q, p)}$ is obtained with the light source luminance $Y_{2-(q, p)}(\leq Y_1)$, thereby controlling the light transmittance (aperture ratio) Lt of pixels or sub pixels. Here, functions $f_R$, $f_G$, $f_B$ in Equation (4-1), Equation (4-2), Equation (4-3) are functions that are determined in advance for performing such correction (compensation).

$$X_{R-(q, p)} = f_R(b_{1\_R} \cdot x_{R-(q, p)}^{2.2} + b_{0\_R}) \tag{4-1}$$

$$X_{G-(q, p)} = f_G(b_{1\_G} \cdot x_{G-(q, p)}^{2.2} + b_{0\_G}) \tag{4-2}$$

$$X_{B-(q, p)} = f_B(b_{1\_B} \cdot x_{B-(q, p)}^{2.2} + b_{0\_B}) \tag{4-3}$$

In this way, the image display operation in one image display frame is completed.

Embodiment 2

Embodiment 2 is a modification of Embodiment 1. As shown in the schematic placement/arrangement of FIGS. 2A and 2B, in Embodiment 2, each light-emitting element unit 43 includes one red light-emitting element (red light emitting diode 44R), one green green-emitting element (green light emitting diode 44G), and one blue light-emitting element (blue light emitting diode 44B). Further, these three light emitting elements 44R, 44B, 44G are respectively arranged at the distal end portion of the vertical bar of an imaginary character "L", the distal end portion of the horizontal bar thereof, and the intersection of the vertical bar and the horizontal bar. It should be noted that the vertical bar and horizontal bar of the imaginary character "L" are parallel to the sides of the surface light source unit, and the intersection of the vertical bar and horizontal bar of the imaginary character "L" is in close proximity to a corner of the surface light source unit.

Further, the arrangement order of the red light-emitting elements 44R, the green light-emitting elements 44G, and the blue light-emitting elements 44B in the four sides of the surface light source unit $42_{(q, p)}$ is such that when moving along the four sides of the surface light source unit $42_{(q, p)}$ clockwise around the center of mass of the surface light source unit $42_{(q, p)}$ in all of the sides, the light-emitting elements 44R, 44G, 44B are arranged in the order of the green light-emitting element 44G, the blue light-emitting element 44B, the red the green light-emitting element 44R, and the green light-emitting element 44G.

Further, as shown in the schematic placement/arrangement of FIG. 2B, while one red light-emitting element 44R, one green light-emitting element 44G, and one blue light-emitting element 44B are arranged along one side of the surface light source unit $42_{(q, p)}$ light emitting elements of the same color are not arranged adjacent to each other along one side of one surface light source unit $42_{(q, p)}$. Further, when viewed along the sides of two adjacent surface light source units [with the surface light source unit $42_{(q, p)}$ taken as the center, a surface light source unit $42_{(q-1, p)}$, a surface light source unit $42_{(q+1, p)}$, a surface light source unit $42_{(q, p-1)}$, and a surface light source unit $42_{(q, p+1)}$] as well, the arrangement order of the red light-emitting elements 44R, the green light-emitting elements 44G, and the blue light-emitting elements 44B is the same among the respective sides.

Except for the arrangement of the light emitting diodes described above, the configuration, structure, operation, and driving method according to Embodiment 2 are the same as the configuration, structure, operation, and driving method according to Embodiment 1. Therefore, detailed description thereof is omitted.

While the present invention has been described above by way of its preferred embodiments, the present invention is not limited to these embodiments. The configurations and structures of the transmission-type color liquid crystal display unit, surface light source device, surface light source unit, liquid crystal display unit assembly, and driving circuit illustrated in the embodiments, and also components and materials thereof are only exemplary and may be modified as appropriate. While in the embodiments the respective light-emitting element units are arranged near the four corners of the surface light source unit, the arrangement of the respective light-emitting element units is not limited to this. The respective light-emitting element units may be arranged near the four sides of the surface light source unit. It is also possible to monitor the temperature of the light emitting diode by a temperature sensor, and feed back the monitoring result to the surface-light-source-unit driving circuit 80, thereby performing luminance compensation (correction) or temperature control of the surface light source unit 42. While the above description of the embodiments is based on the assumption that the display area of the liquid crystal display unit is divided into P×Q imaginary display area units, depending on the case, the transmission-type liquid crystal display unit may have a structure in which it is divided into P×Q actual display area units.

While in the above embodiments the description is directed to a surface light source device that satisfies the constituent features of the surface light source device according to the first aspect of the present invention, the constituent features of the surface light source device according to the second aspect of the present invention, and the constituent features of the surface light source device according to the third aspect of the present invention at the same time, naturally, the surface light source device may:

(1) satisfy only the constituent features of the surface light source device according to the first aspect of the present invention;

(2) satisfy only the constituent features of the surface light source device according to the second aspect of the present invention;

(3) satisfy only the constituent features of the surface light source device according to the third aspect of the present invention;

(4) satisfy the constituent features of the surface light source device according to the first aspect of the present invention and the constituent features of the surface light source device according to the second aspect of the present invention;

(5) satisfy the constituent features of the surface light source device according to the second aspect of the present invention and the constituent features of the surface light source device according to the third aspect of the present invention; and (6) satisfy the constituent features of the surface light source device according to the third aspect of the present invention and the constituent features of the surface light source device according to the first aspect of the present invention.

What is claimed is:

1. A surface light source device which illuminates a transmission-type liquid crystal display unit from a back surface, the liquid crystal display unit having a display area including pixels arranged in a two-dimensional matrix, the surface light source device comprising:

P×Q surface light source units corresponding to P×Q imaginary display area units obtained by assuming that the display area of the liquid crystal display unit is divided into the P×Q imaginary display area units, wherein:

light sources included in the surface light source units are individually controlled and are configured to emit white light, the P×Q surface light source units comprise at least one first surface light source unit and each of the at least one first surface light source units includes first light sources, the white light emitted by the first light sources of each of the at least one first surface light source units has a luminance profile, and for each luminance profile of the white light emitted by the first light sources of each of the at least one first surface light source unit, a center of mass of that luminance profile is located inside a circle of diameter D drawn around a center of mass of a corresponding first surface light source unit of the at least one first surface light source unit, such that the first light sources of that corresponding first surface light source unit are configured to emit white light for an entirety of the surface light source unit, where D is determined by the equation $D=0.2\ S_0^{1/2}$ and $S_0$ is a surface area of that corresponding first surface light source unit.

2. The surface light source device of claim 1, wherein each light source of the light sources of the surface light source units are individually controlled such that an emitted luminescence of light emitted by the light source is at a maximum value by adjusting a generated luminescence of light generated by a light-emitting circuit and/or by adjusting a transmittance of the light source such that the generated luminescence and the transmittance are at a predetermined ratio.

3. The surface light source device of claim 2, wherein the maximum value is determined based on a light that would be generated when a maximum control signal able to be applied to the light source is applied to the light source.

4. The surface light source device of claim 2, wherein the predetermined ratio is based on a maximum possible luminescence of the light source and a maximum possible transmittance of the light source.

5. The surface light source device of claim 1, further comprising:

a controlling unit configured to control a luminance of the light sources of the surface light source units; and a driving circuit configured to control a transmittance of said liquid crystal display unit, wherein the driving circuit is configured to set a transmittance of at least one of said pixels of the display area to a specified value based at least in part on a control performed by the controlling unit of a luminance of a first light source at a position in the surface light source device corresponding to the at least one pixel, wherein the driving circuit is configured to set the transmittance of the at least one pixel to achieve a pixel luminance for the at least one pixel equivalent to a pixel luminance that could be achieved for the at least one pixel when the controlling unit applies a maximum signal to the first light source.

6. The surface light source device of claim 5, wherein said maximum signal is a maximum value among signals that the controlling unit can apply to red light sources, green light sources, and blue light sources.

7. A surface light source device which illuminates a transmission-type liquid crystal display unit from a back surface, the liquid crystal display unit having a display area including pixels arranged in a two-dimensional matrix, the surface light source device comprising:
   P×Q surface light source units partitioned from one another by partition walls,
   wherein
      each of the surfaces of the partition walls diffuse reflected light or specularly reflect light;
      light sources included in the surface light source units are individually controlled, and
      a light source included in each of the surface light source units includes a light-emitting circuit, the light-emitting circuit comprising at least one light-emitting unit, each of the at least one light-emitting unit being positioned in an area of the light source such that the light-emitting circuit is arranged to emit white light of a uniform color for an entirety of the surface light source unit, the at least one light-emitting unit being positioned such that a center of mass of the luminance profile for the at least one light-emitting unit coincides with a center of mass of an area defined by the partition walls of the surface light source unit such that the at least one light-emitting unit is configured to emit white light of a uniform color for an entirety of the surface light source unit.

8. A transmission-type liquid crystal display unit which has a display area including pixels arranged in a two-dimensional matrix, comprising a surface light source device that illuminates the liquid crystal display unit from a back surface,
   wherein:
      the surface light source device includes P×Q surface light source units corresponding to P×Q imaginary display area units obtained by assuming that the display area of the liquid crystal display unit is divided into the P×Q imaginary display area units;
      light sources included in the surface light source units are individually controlled and are configured to emit white light;
      the P×Q surface light source units comprise at least one first surface light source unit and each of the at least one first surface light source units includes first light sources,
      the white light emitted by the first light sources of each of the at least one first surface light source units has a luminance profile, and
      for each luminance profile of the white light emitted by the first light sources of each of the at least one first surface light source unit, a center of mass of that luminance profile is located inside a circle of diameter D drawn around a center of mass of a corresponding first surface light source unit of the at least one first surface light source unit, such that the first light sources of that corresponding first surface light source unit are configured to emit white light for an entirety of the surface light source unit, where D is determined by the equation $D=0.2\,S_0^{1/2}$ and $S_0$ is a surface area of that corresponding first surface light source unit.

* * * * *